(12) United States Patent
Zhang et al.

(10) Patent No.: US 11,209,367 B2
(45) Date of Patent: Dec. 28, 2021

(54) MULTI-COLOR IMAGING USING SALVAGED FLUORESCENCE

(71) Applicant: Yale University, New Haven, CT (US)

(72) Inventors: Yongdeng Zhang, New Haven, CT (US); Joerg Bewersdorf, Guilford, CT (US)

(73) Assignee: YALE UNIVERSITY, New Haven, CT (US)

( * ) Notice: Subject to any disclaimer, the term of this patent is extended or adjusted under 35 U.S.C. 154(b) by 14 days.

(21) Appl. No.: 16/551,192

(22) Filed: Aug. 26, 2019

(65) Prior Publication Data
US 2020/0064268 A1    Feb. 27, 2020

Related U.S. Application Data

(60) Provisional application No. 62/723,291, filed on Aug. 27, 2018.

(51) Int. Cl.
  *G01N 21/64*    (2006.01)
  *G02B 21/00*    (2006.01)
  *G02B 21/16*    (2006.01)

(52) U.S. Cl.
  CPC ..... *G01N 21/6458* (2013.01); *G02B 21/0032* (2013.01); *G02B 21/0072* (2013.01);
  (Continued)

(58) Field of Classification Search
  CPC ....... G01N 21/6458; G01N 2021/6421; G02B 21/0032; G02B 21/0076; G02B 21/16; G02B 21/0072; G02B 27/58
  See application file for complete search history.

(56) References Cited

U.S. PATENT DOCUMENTS

7,333,207 B2    2/2008  Bewersdorf et al.
8,263,946 B2 *  9/2012  Gugel ................ G01N 21/6458
                                                250/459.1
(Continued)

OTHER PUBLICATIONS

Aquino, D., et al., "Two-color nanoscopy of three-dimensional volumes by 4Pi detection of stochastically switched fluorophores", Nature Methods, vol. 8, No. 4, Apr. 2011, pp. 353-361.
(Continued)

*Primary Examiner* — Mark R Gaworecki
(74) *Attorney, Agent, or Firm* — Saul Ewing Arnstein & Lehr LLP; Kathryn Doyle; Brian Landry

(57) ABSTRACT

Methods and systems for fluorescence imaging are described herein. The method can include: receiving a fluorescence signal including an excitation signal, a first emission signal for a first fluorophore having a first emission spectra, and a second emission signal for a second fluorophore having a second emission spectra; filtering the fluorescence signal to: isolate a first channel encompassing at least one of: a bandwidth of at least 1 nm within which an emission intensity of the first emission spectra is at least twice an emission intensity of the second emission spectra, a bandwidth having a rising edge of the first emission spectra; and at least 10% by height of a rising edge of the first emission spectra, and produce a channel including the fluorescence signal less the first channel; and directing the first channel and the resulting channel to different regions of one or more cameras for collecting fluorescence emissions.

13 Claims, 41 Drawing Sheets
(41 of 41 Drawing Sheet(s) Filed in Color)

(52) U.S. Cl.
CPC . *G02B 21/0076* (2013.01); *G01N 2021/6421* (2013.01); *G02B 21/16* (2013.01)

(56) References Cited

U.S. PATENT DOCUMENTS

| | | | | |
|---|---|---|---|---|
| 2004/0087006 | A1* | 5/2004 | Rygiel | G02B 21/0024 435/287.1 |
| 2005/0006597 | A1* | 1/2005 | Wolleschensky | G02B 21/18 250/458.1 |
| 2006/0033988 | A1* | 2/2006 | Mikuriya | G02B 21/0024 359/385 |
| 2006/0114466 | A1* | 6/2006 | Bewersdorf | G02B 21/0076 356/450 |
| 2006/0158721 | A1* | 7/2006 | Nakata | G02B 21/0068 359/386 |
| 2009/0021746 | A1* | 1/2009 | Toida | G01N 21/6428 356/484 |
| 2010/0182683 | A1* | 7/2010 | Okugawa | G02B 21/0076 359/389 |
| 2011/0025831 | A1* | 2/2011 | Bewersdorf | G02B 21/16 348/50 |
| 2011/0278470 | A1* | 11/2011 | Bouzid | G02B 21/002 250/459.1 |
| 2011/0297847 | A1* | 12/2011 | Courtney | G02B 21/0076 250/459.1 |
| 2012/0305803 | A1* | 12/2012 | Foelling | G02B 21/16 250/459.1 |
| 2013/0015370 | A1* | 1/2013 | Damaskinos | G01N 21/6452 250/459.1 |
| 2013/0147916 | A1* | 6/2013 | Bennett | G01B 11/24 348/46 |
| 2014/0353524 | A1* | 12/2014 | Danuser | G02B 21/367 250/459.1 |
| 2017/0176338 | A1* | 6/2017 | Wu | G01J 3/2823 |
| 2017/0251191 | A1* | 8/2017 | Huang | G01N 21/6458 |
| 2018/0052107 | A1* | 2/2018 | Kim | G01N 21/17 |
| 2018/0088304 | A1* | 3/2018 | Stelzer | G02B 21/06 |
| 2019/0018231 | A1* | 1/2019 | Dixon | G02B 21/002 |

OTHER PUBLICATIONS

Guggenheim, E., et al., "Reflectance imaging for visualization of unlabelled structures using Nikon A1 and N-SIM", cloudfront.net, 2016.

Hartwich, T., "Development and Characterization of Single-Molecule Switching Nanoscopy Approaches for Deeper and Faster Imaging", Dissertation submitted to the Combined Faculties for the Natural Sciences and for Mathematics of the Ruperto-Carola University of Heidelberg, Germany for the degree of Doctor of Natural Sciences, Jan. 31, 2013.

Winterflood, C. M., et al., "Dual-Color 3D Superresolution Microscopy by Combined Spectral-Demixing and Biplane Imaging", Biophysical Journal, vol. 109, Jul. 2015, pp. 3-6.

Patton, B. R., et al., "Is phase-mask alignment aberrating your STED microscope?" Methods and Applications in Fluorescence 3, 2015, 11 pages.

Winterflood, C. M., et al., "Supporting Material for Dual-Color 3D Superresolution Microscopy by Combined Spectral-Demixing and Biplane Imaging", Jul. 2015, 9 pages.

Takakura, H., et al., "Long time-lapse nanoscopy with spontaneously blinking membrane probes", Nature Biotechnology 35, 2017, pp. 773-780.

Wäldchen, S., et al., "Light-induced cell damage in live-cell super-resolution microscopy", Scientific Reports, Oct. 20, 2015, 12 pages.

* cited by examiner

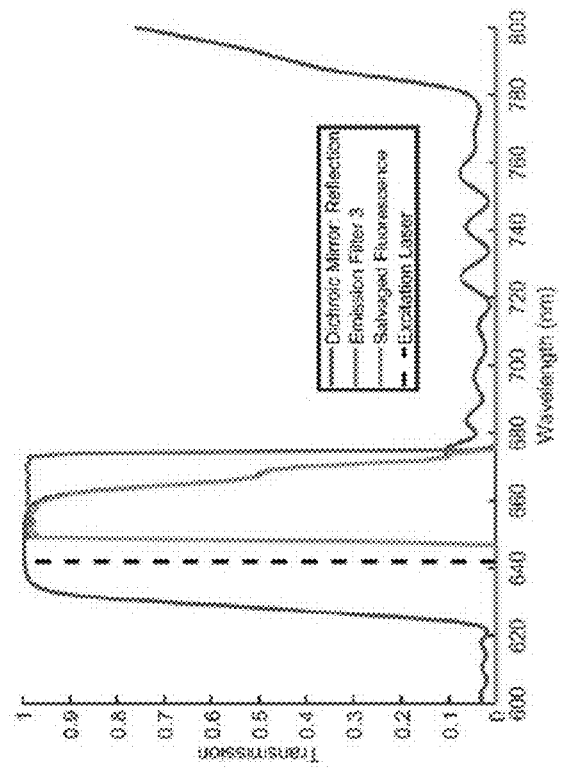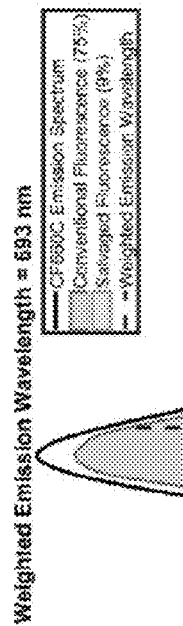
FIG. 4C
FIG. 4D
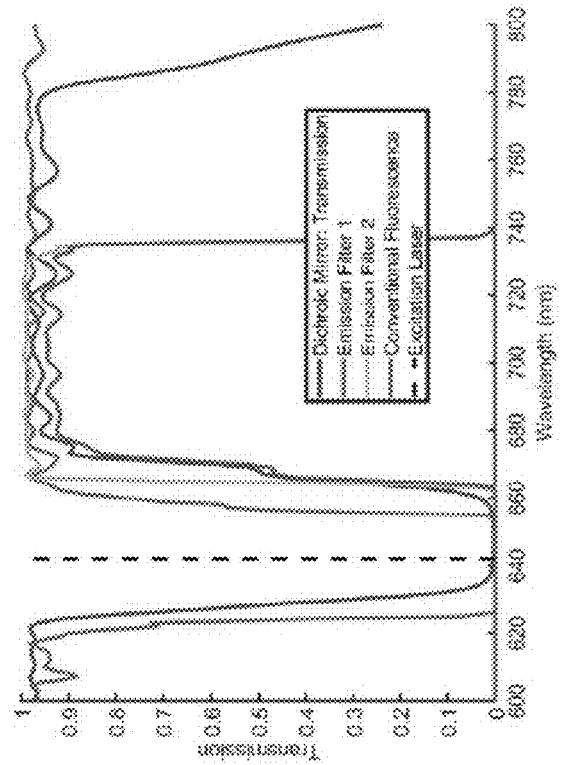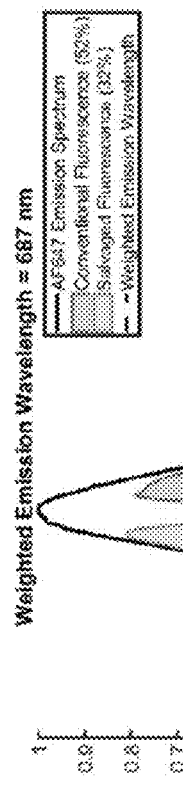
FIG. 4E
FIG. 4F

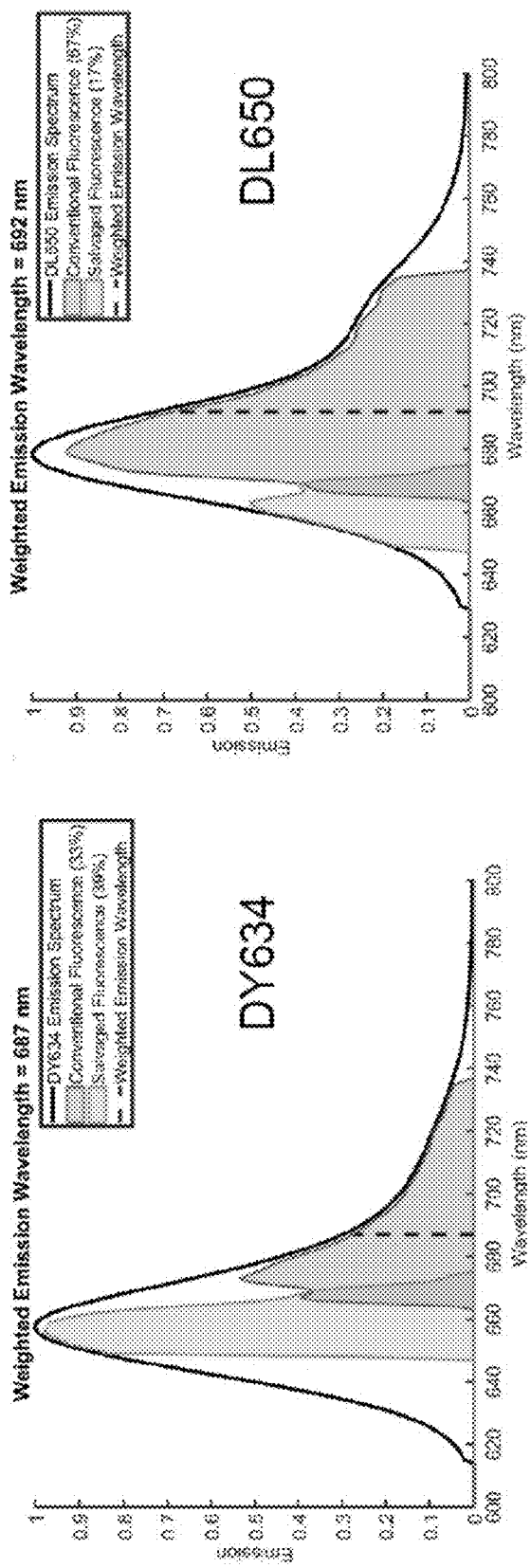
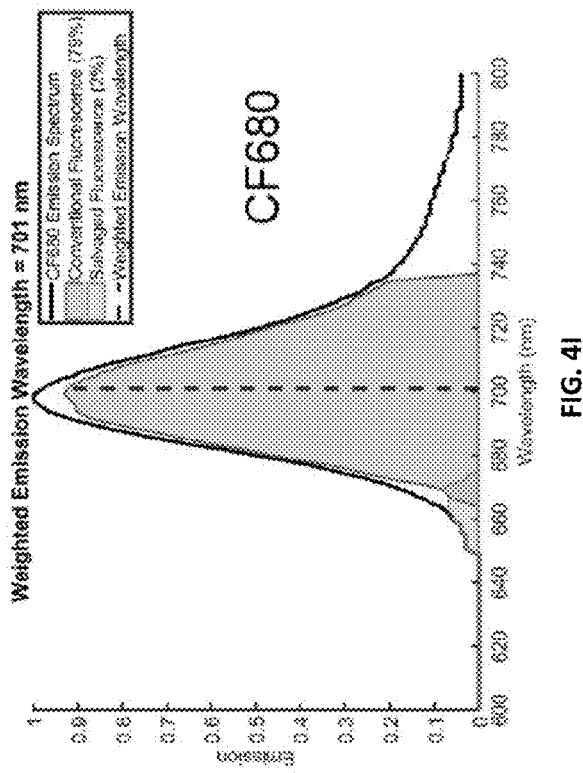
FIG. 4G
FIG. 4H
FIG. 4I

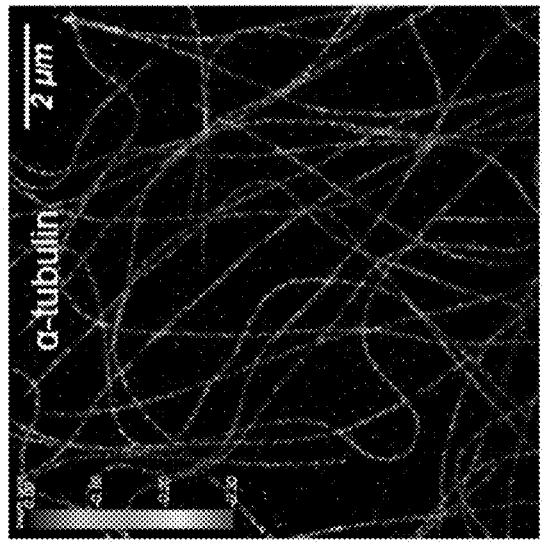
FIG. 6A
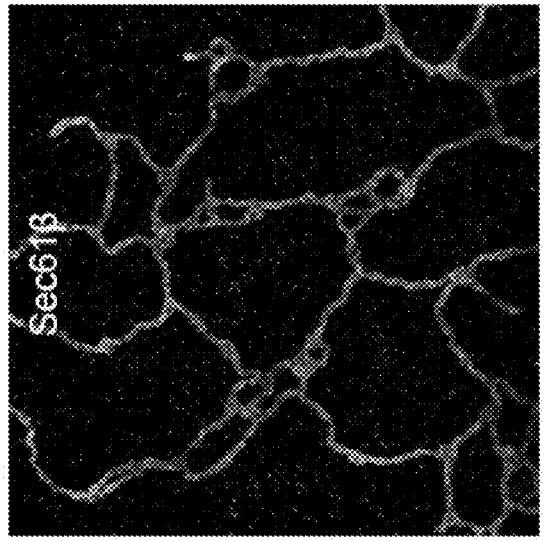
FIG. 6B
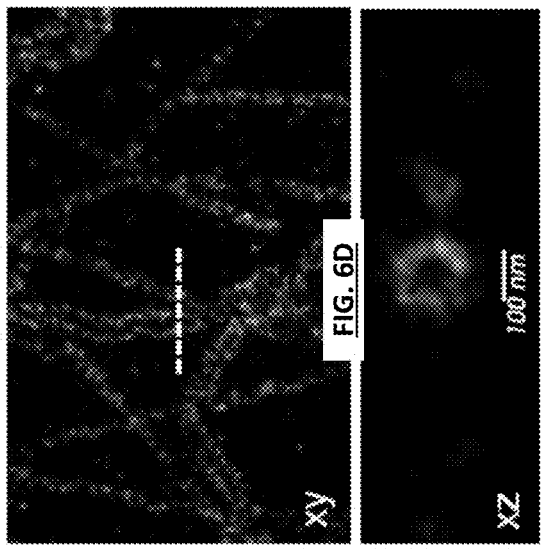
FIG. 6D
FIG. 6E
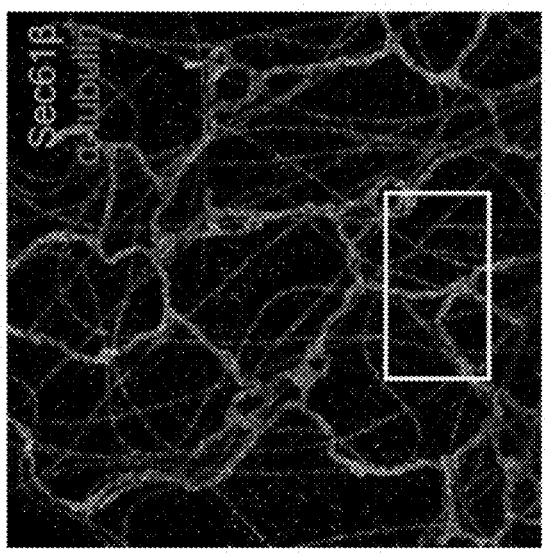
FIG. 6C

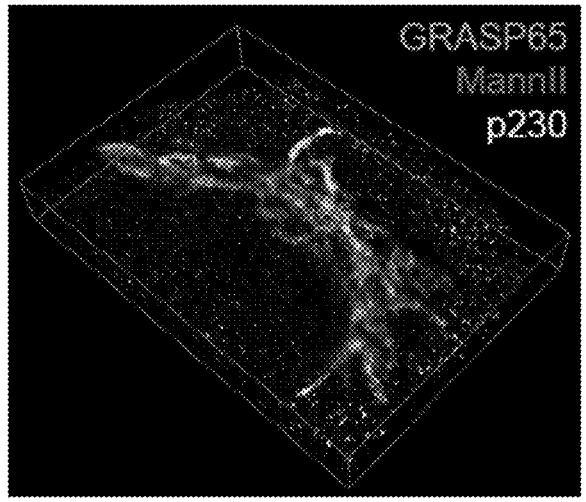
FIG. 12D
FIG. 12E
FIG. 12F
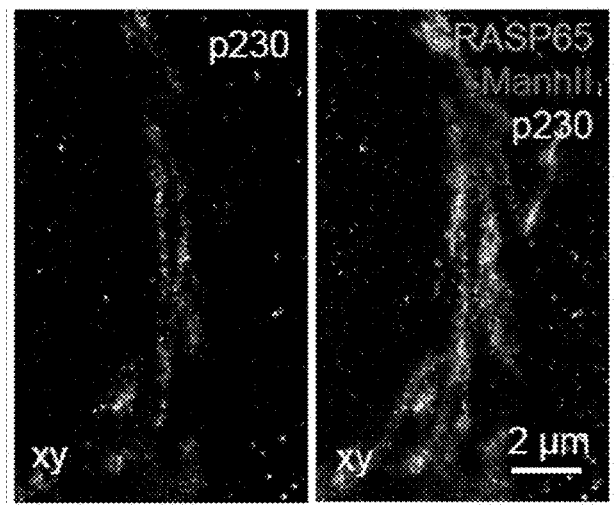
FIG. 12G     FIG. 12H

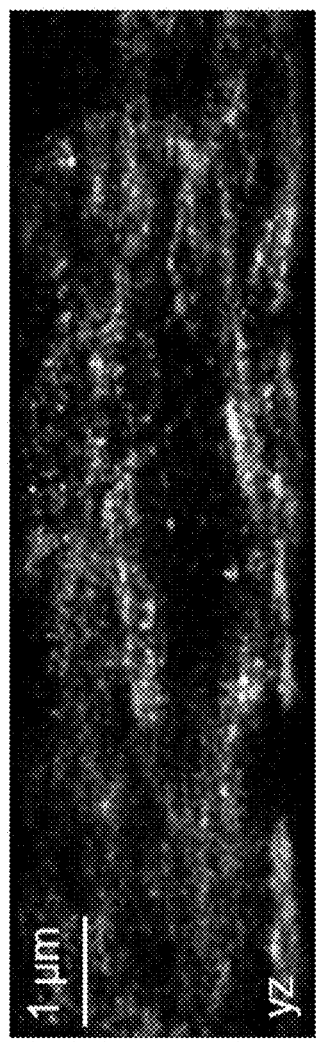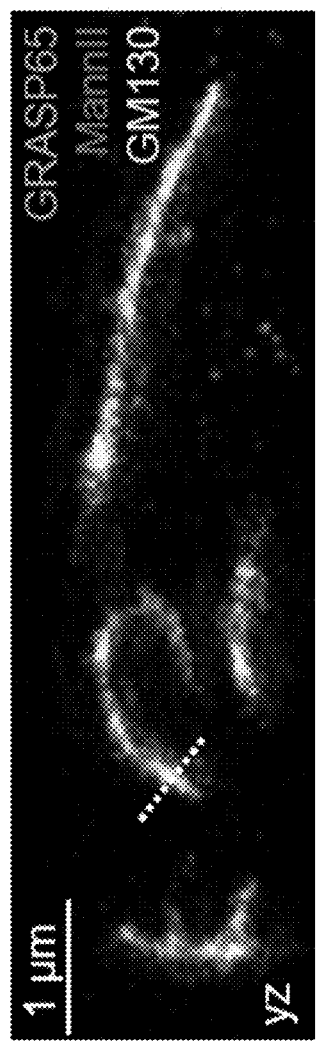
FIG. 12I  FIG. 12J
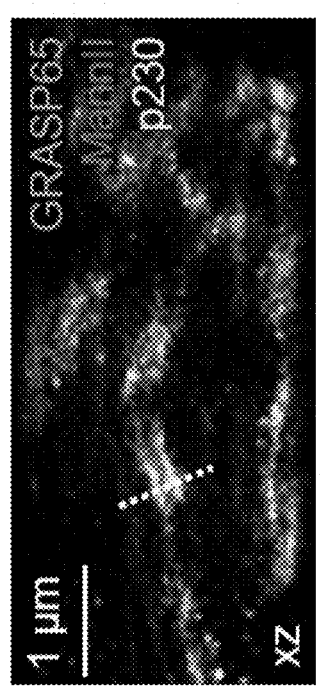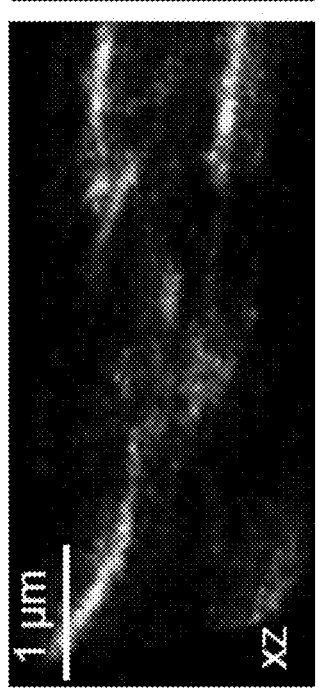
FIG. 12K  FIG. 12L ated by National Institutes of Health. The government has certain rights in the invention.

MULTI-COLOR IMAGING USING SALVAGED FLUORESCENCE

CROSS-REFERENCE TO RELATED APPLICATIONS

This application claims the benefit of priority under 35 U.S.C. § 119(e) of U.S. Provisional Patent Application No. 62/723,291, filed Aug. 27, 2018, the entire disclosure of which is hereby incorporated herein by reference.

STATEMENT REGARDING FEDERALLY SPONSORED RESEARCH OR DEVELOPMENT

This invention was made with government support under RO1 GM118486-02 awarded by National Institutes of Health. The government has certain rights in the invention.

BACKGROUND OF THE INVENTION

Super-resolution techniques like single-molecule switching (SMS) microscopy have achieved about 20-30 nm spatial resolution in mammalian cells. While SMS has been very successful in revealing the internal nanostructure of cells, its limited multi-color imaging capabilities have prevented many complex applications that require precise correlation of multiple targets. There remains a need in the art for improved methods of multi-color imaging in fluorescence microscopy techniques.

SUMMARY OF THE INVENTION

Methods and systems for fluorescence imaging are described herein.

In one aspect, a method of fluorescence imaging includes: receiving a fluorescence signal including an excitation signal, a first emission signal for a first fluorophore having a first emission spectra, and a second emission signal for a second fluorophore having a second emission spectra different than the first emission spectra; filtering the fluorescence signal to: isolate a first channel encompassing at least one from the group consisting of: a bandwidth of at least 1 nm within which an emission intensity of the first emission spectra is at least two times an emission intensity of the second emission spectra, a bandwidth of at least 1 nm of a rising edge of the first emission spectra; and at least 10% by height of a rising edge of the first emission spectra; and producing a resulting channel including the fluorescence signal less the first channel; and directing the first channel and the resulting channel to different regions of one or more cameras adapted and configured to collect fluorescence emissions.

In one aspect, a method of fluorescence imaging includes: receiving a fluorescence signal including an excitation signal having an excitation wavelength, a first emission signal for a first fluorophore having a first emission spectra, and a second emission signal for a second fluorophore having a second emission spectra having a peak at a higher wavelength than the first emission spectra; filtering the fluorescence signal to: isolate a first channel having: a lower bound between 1 nm and 5 nm greater than the excitation wavelength, and an upper bound of no greater than 20th percentile of the second emission spectra, and produce a resulting channel including the fluorescence signal less the first channel; and directing the first channel and the resulting channel to different regions of one or more cameras adapted and configured to collect fluorescence emissions.

In one aspect, a method of measuring at least two fluorescence signals in a fluorescence microscopy signal admixed with an excitation includes directing the fluorescence microscopy signal and excitation beam towards a first dichroic mirror such that an at least one first fluorescent signal and the excitation beam are reflected off of the dichroic mirror along Path A and an at least one second fluorescent signal is transmitted through the dichroic mirror along Path B; directing the at least one first fluorescent signal and the excitation beam on Path A into at least one selected from a second dichroic mirror and an emission filter, such that the excitation beam is separated from the at least one first fluorescent signal and the at least one first fluorescent signal is directed along Path C; directing the at least one first fluorescent signal along Path C into a first camera adapted and configured to collect fluorescence emissions; and directing the at least one second fluorescent signal along Path B into a second camera adapted and configured to collect fluorescence emissions.

This aspect of the invention can have a variety of embodiments. In some cases, the at least one first fluorescent signal along Path C and the at least one second fluorescent signal along Path B are directed towards the first camera and second camera, respectively, through the use of at least one reflective mirror. In some cases, the at least one first fluorescent signal and the excitation beam on Path A are directed into a second dichroic mirror that reflects the at least one first fluorescent signal along Path C and transmits the excitation beam. In some cases, the at least one first fluorescent signal and the excitation beam on Path A are directed into a second dichroic mirror that reflects the excitation beam and transmits the at least one first fluorescent signal along Path C.

In some cases, the at least one first fluorescent signal and the excitation beam on Path A are directed into an emission filter that blocks transmission of the excitation beam and transmits the at least one first fluorescent signal along Path C. In some cases, the wavelength maximum difference between at least one first fluorescent signal and at least one second fluorescent signal is about 10 nm to about 100 nm. In some cases, the wavelength maximum difference between at least one first fluorescent signal and at least one second fluorescent signal is about 20 nm to about 60 nm.

In some cases, the fluorescence microscopy signal and the excitation beam are derived from a confocal microscopy system. In some cases, the fluorescence microscopy signal and the excitation beam are derived from a 4Pi-SMS microscopy system.

BRIEF DESCRIPTION OF THE DRAWINGS

The patent or application file contains at least one drawings executed in color. Copies of this patent or patent application publication with color drawing(s) will be provided by the Office upon request and payment of the necessary fee.

For a fuller understanding of the nature and desired objects of the present invention, reference is made to the following detailed description taken in conjunction with the accompanying drawing figures wherein like reference characters denote corresponding parts throughout the several views.

FIG. 2A is a conventional dual-objective system adapted to salvage fluorescence from the excitation beam path. FIG. 2B is a 4Pi system adapted to salvage fluorescence from the excitation beam path.

FIG. 4C is a set of transmission profiles of the dichroic mirror and emission filters for the conventional fluorescence collection in a system of the invention.

FIG. 4D is a set of transmission profiles of the dichroic mirror and emission filters for the salvaged fluorescence collection in a system of the invention.

FIGS. 4E-4I are the emission spectra of various dyes and the fraction of conventional and salvaged fluorescence collected within the windows shown in FIGS. 4C and 4D.

FIGS. 6A-6E are two-color 4Pi-SMS images of microtubules (a-tubulin antibody) and ER membrane (GFP-Sec6113 labeled with anti-GFP antibody) collected using methods of the invention.

FIG. 7C is the combined image showing both Sec610 and mCherry-KDEL. FIGS. 7D and 7E are xz and yz cross-sections of the image shown in FIG. 7C.

FIG. 9A is an image of mitochondria outer membrane labeled with anti-TOM20 antibody and AF647 labeled secondary antibody. FIG. 9B is an image of mitochondrial DNA labeled with anti-dsDNA antibody and CF660C labeled secondary antibody. FIG. 9C is a merged image of FIGS. 9A and 9B. FIG. 9D is a 3D view of a subregion depicted in FIG. 9C. FIG. 9E is an xy view of a 50 nm thick z-slice of FIG. 9D. FIG. 9F is an xz view of a 50 nm thick y-slice along the dash line in FIG. 9E. FIG. 9G is a yz view of a 50 nm thick x-slice along the dash line in FIG. 9E.

FIG. 10A is an overview image of the synaptonemal complexes labeled with SYCP3 antibody and AF647 labeled secondary antibody. FIGS. 10I-10O are 4Pi-SMS imaging of synaptonemal complexes labeled with SYCP3 and SYCP1-N terminal antibodies and FIG. 10P is an intensity profile of the boxed region shown in FIG. 10O.

FIG. 11A is an emission spectrum of DY634, DL650 and CF680 dyes, and the collection windows for conventional and salvaged fluorescence. FIG. 11B is a plot of salvaged fluorescence vs. conventional fluorescence intensities of single molecules labeled with DY634, DL650, or CF680. FIG. 11C is a set of conventional and salvaged fluorescence images of single molecules labeled with DY634, DL650, or CF680. The dash circles indicate the corresponding mapping positions of single molecules in the salvaged fluorescence images from the localized positions in the conventional fluorescence images. FIG. 11D is a three-color microtubule image labeled with DY634, DL650, and CF680 together. FIG. 11E is a magnified image of the box region in FIG. 11D with an inset image showing a 20 nm thick tubule cross-section at white dashed line. FIG. 11F is a graph reporting cross-talks between each dye. The cross-talks are below 2% when about 10% of the molecules are rejected. FIG. 11G is a graph reporting the chromatic shifts between each dye pair. The largest chromatic shifts are between DY634 and CF680 (<5 nm in all dimensions). Data are presented as mean±SEM (n=13).

FIG. 12A is a 3D overview image of Golgi labeled with anti-p230 antibody and Dy634 labeled secondary antibody. FIG. 12D is a merged image of FIGS. 12A-12C. FIGS. 12E-12G are xy views of a 500 nm thick z-slice of the labeled Golgi apparatus and FIG. 12H is a merged image of FIGS. 12E-12G. FIG. 12I is an xz view of a 500 nm thick y-slice of the labeled Golgi apparatus. FIG. 12J is a yz view of a 500 nm thick x-slice of the labeled Golgi apparatus. FIG. 12K is a graph showing an intensity profile along the dash line in FIG. 12I. FIG. 12L is an xz view of a 500 nm thick y-slice of three-color Golgi imaging labeled with anti-GRASP65, anti-GM130, and Mannll-GFP overexpression combined with anti-GFP. FIG. 12N is an intensity profile along the dash line in FIG. 12M.

FIG. 13A is an overview image of the synaptonemal complexes labeled with anti-SYCP3 antibody and DL650 labeled secondary antibody. FIG. 13B is an overview image of the synaptonemal complexes labeled with anti-SYCP1-C terminal antibody and CF680 labeled secondary antibody. FIG. 13C is an overview image of the nuclear envelope labeled with anti-Lamin B antibody and DY634 labeled secondary antibody. FIG. 13D is a merged image of FIGS. 13A-13C. FIG. 13E is a set of xy, xz and yz views of 2 µm thick cross-sections of the synaptonemal complexes. The white dashed circles indicate the positions where the synaptonemal complexes dock at the nuclear envelope. FIGS. 13F-13G are 3D views of individual synaptonemal complexes with the ends docked at the nuclear envelope. FIGS. 13H and 13I are 3D views of individual synaptonemal complexes at different stages of complex assembly.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Figure 14A:
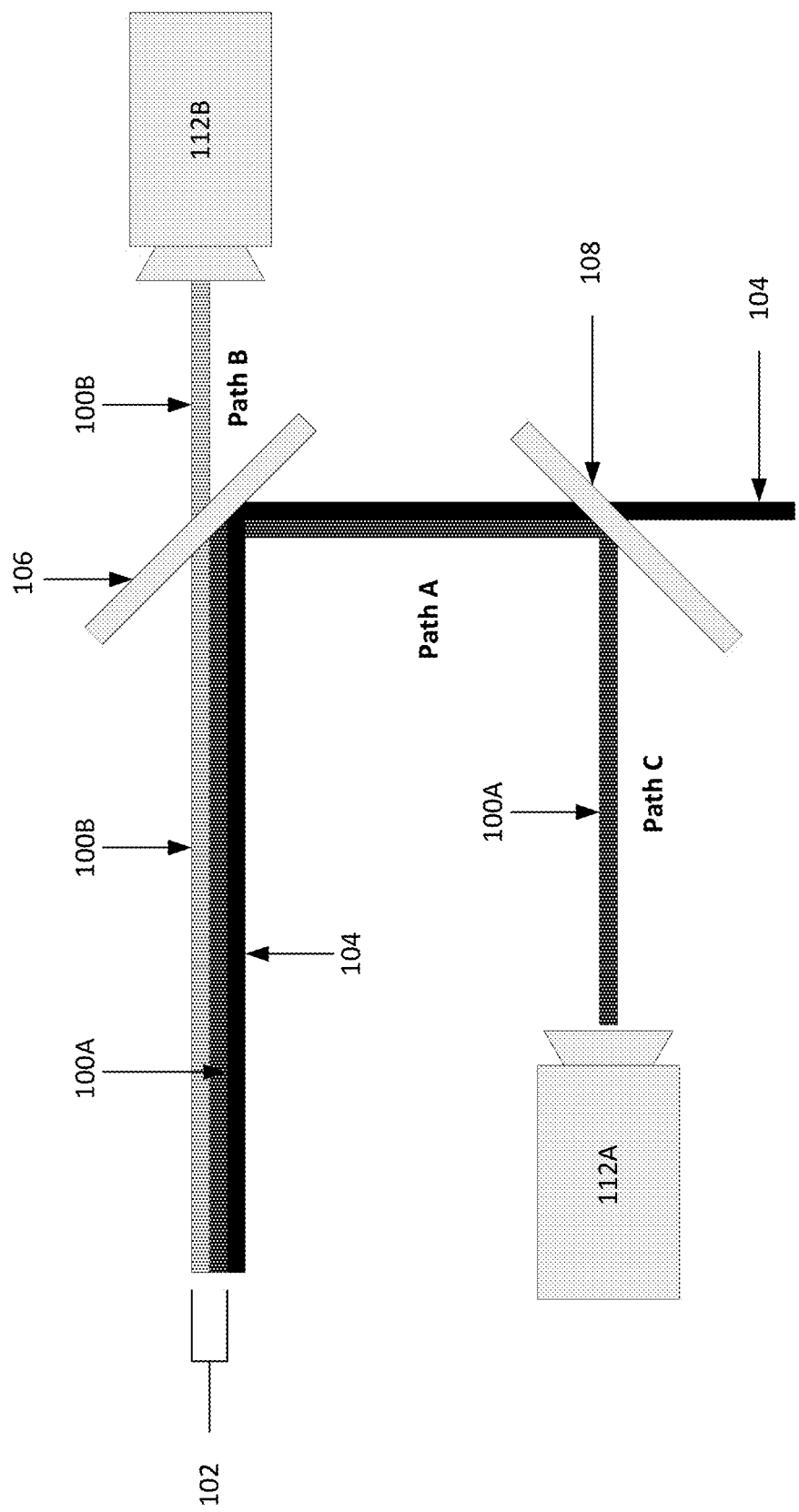
FIGS. 14A-14C depict methods of separating and collecting fluorescent signals, according to certain embodiments of the invention.
Figure 14B:
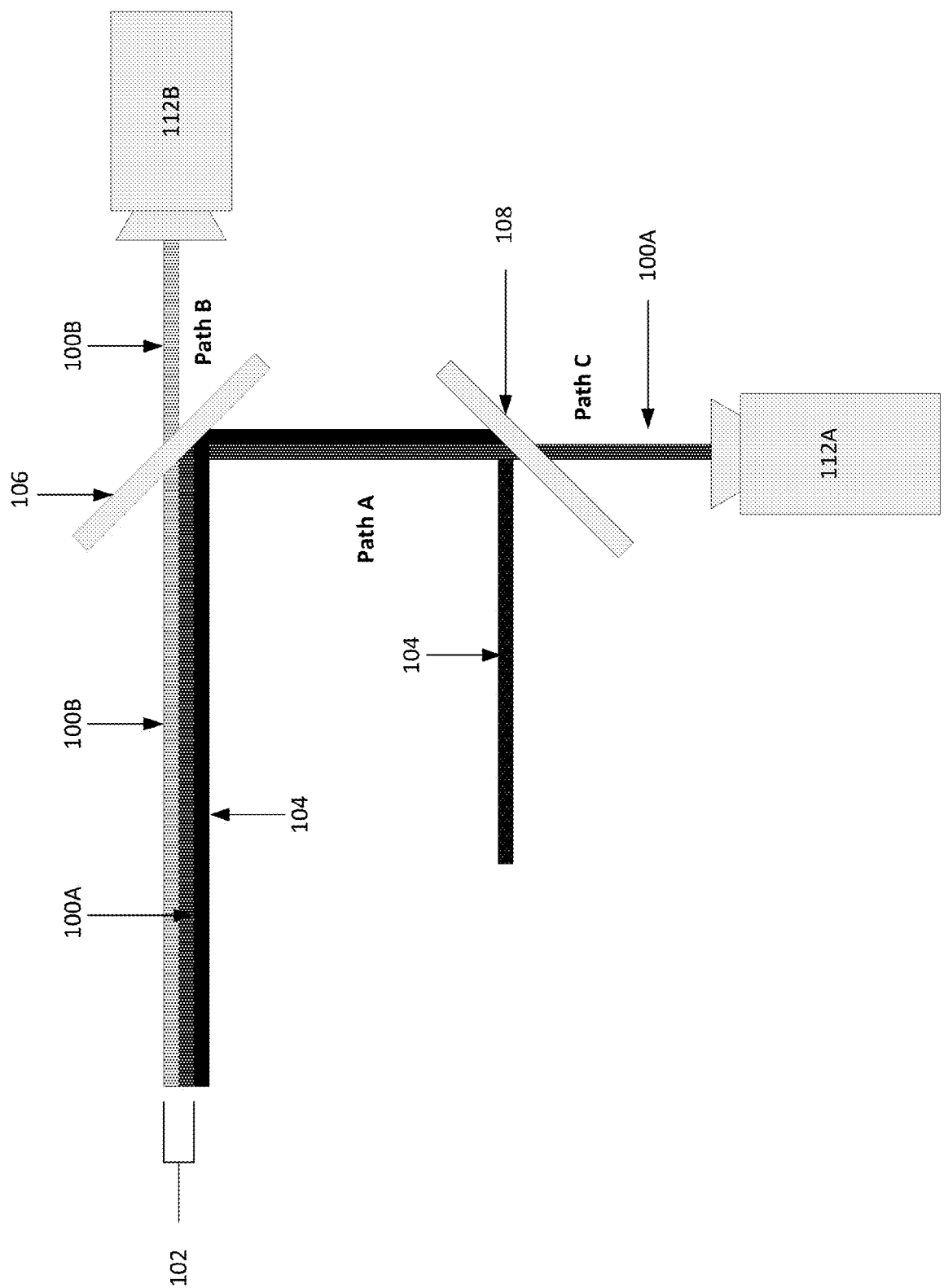
Figure 14C:
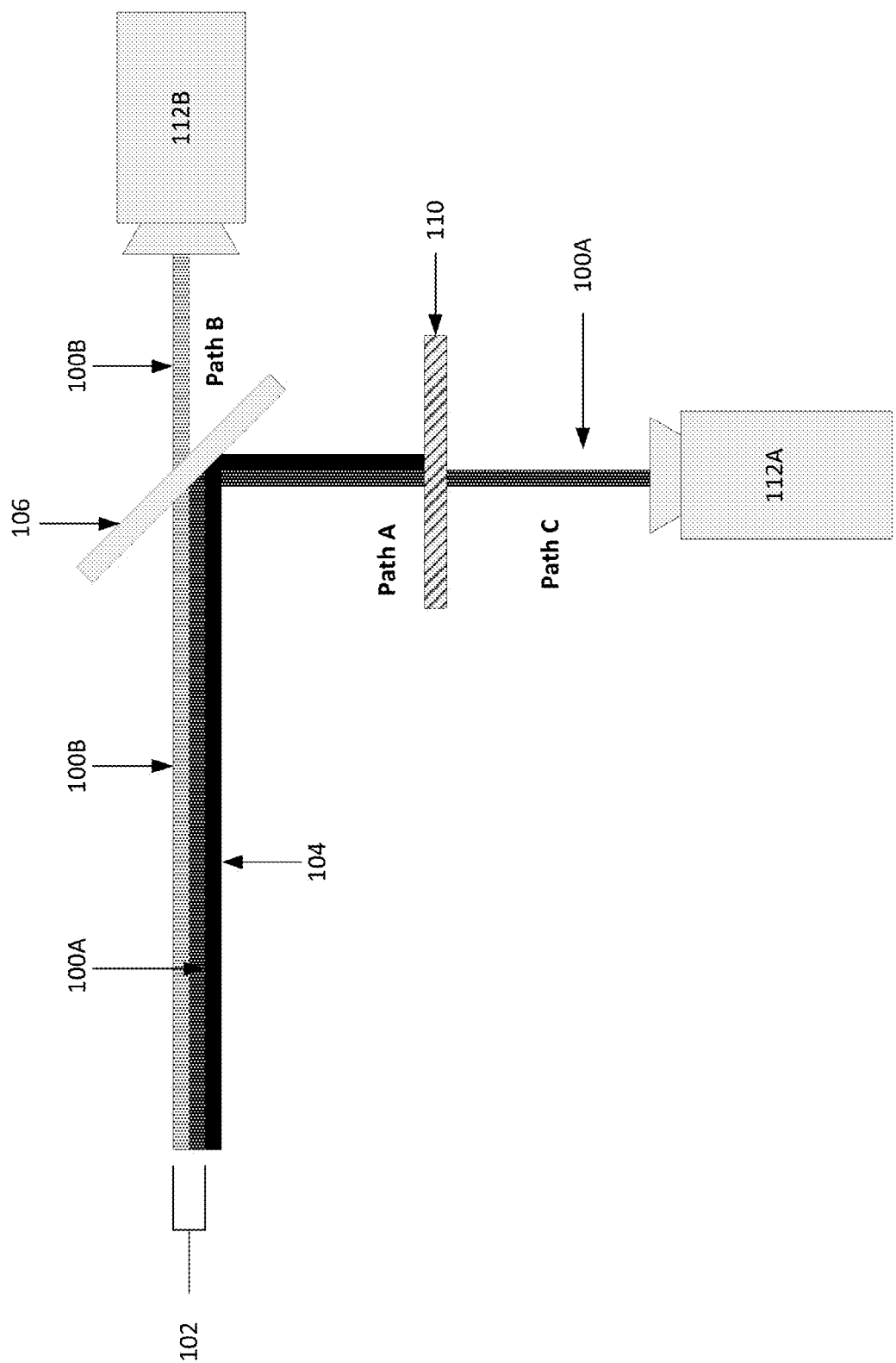

Applicant presents a novel method of simultaneously imaging multiple fluorescent signals from a fluorescence microscopy system. The methods of the invention utilize fluorescence that is otherwise discarded in methods known in the art. By salvaging this wasted fluorescence, the inter-signal cross-talk between different fluorescent signals is minimized. In one aspect, as illustrated in FIGS. 14A-14C, the invention provides a method of measuring at least two fluorescent signals 100A, 100B in a fluorescence microscopy signal 102 admixed with an excitation beam 104. The method includes:

(a) directing the fluorescence microscopy signal 102 and excitation beam 104 towards a first dichroic mirror 106 such that an at least one first fluorescent signal 100A and the excitation beam 104 are reflected off of the first dichroic mirror 106 along Path A and an at least one second fluorescent signal 100B is transmitted through the first dichroic mirror 106 along Path B;

(b) directing the at least one first fluorescent signal 100A and the excitation beam 104 on Path A into at least one selected from a second dichroic mirror 108 and an emission filter 110, such that the excitation beam 104 is separated from the at least one first fluorescent signal 100A and the at least one first fluorescent signal 100A is directed along Path C;

(c) directing the at least one first fluorescent signal 100A along Path C into a first camera 112A adapted and configured to collect fluorescence emissions; and (d) directing the at least one second fluorescent signal 100B along Path B into a second camera 112B adapted and configured to collect fluorescence emissions.

The at least one first fluorescent signal 100A along Path C and the at least one second fluorescent signal 100B along Path B can be optionally directed through the use of at least one reflective mirror. In one embodiment, the at least one first fluorescent signal 100A and the excitation beam 104 on Path A are directed into a second dichroic mirror 108 that reflects the at least one first fluorescent signal along Path C and transmits the excitation beam (see FIG. 14A). In an alternative embodiment, the at least one first fluorescent signal 100A and the excitation beam 104 on Path A are directed into a second dichroic mirror 108 that reflects the excitation beam 104 and transmits the at least one first fluorescent signal 100A along Path C (see FIG. 14B). In another embodiment, the at least one first fluorescent signal 100A and the excitation beam 104 on Path A are directed into an emission filter 110 that blocks transmission of the excitation beam 104 and transmits the at least one first fluorescent signal 100A along Path C (see FIG. 14C).

The methods of the invention allow for imaging of fluorescent compounds having closer emission spectra to one another than methods of the prior art. In certain embodiments, two or more dyes can be utilized where the wavelength maxima difference between any two dyes is as small as 10 nm. Dyes that can be utilized in the methods of the invention can have wavelength maxima differences from about 10 nm to about 100 nm, or from about 20 nm to about 60 nm. The lower wavelength maxima difference cut-off is limited by the increase in cross-talk as the maxima become closer to one another. The upper wavelength maxima difference cut-off is determined based on whether the selected dyes can be simultaneously excited by a single excitation wavelength. In preferred embodiments, the dyes are selected such that they all exhibit stimulated fluorescence in the presence of a single excitation beam. By using a single excitation beam, all fluorescent signals can be collected simultaneously.

Figure 1:
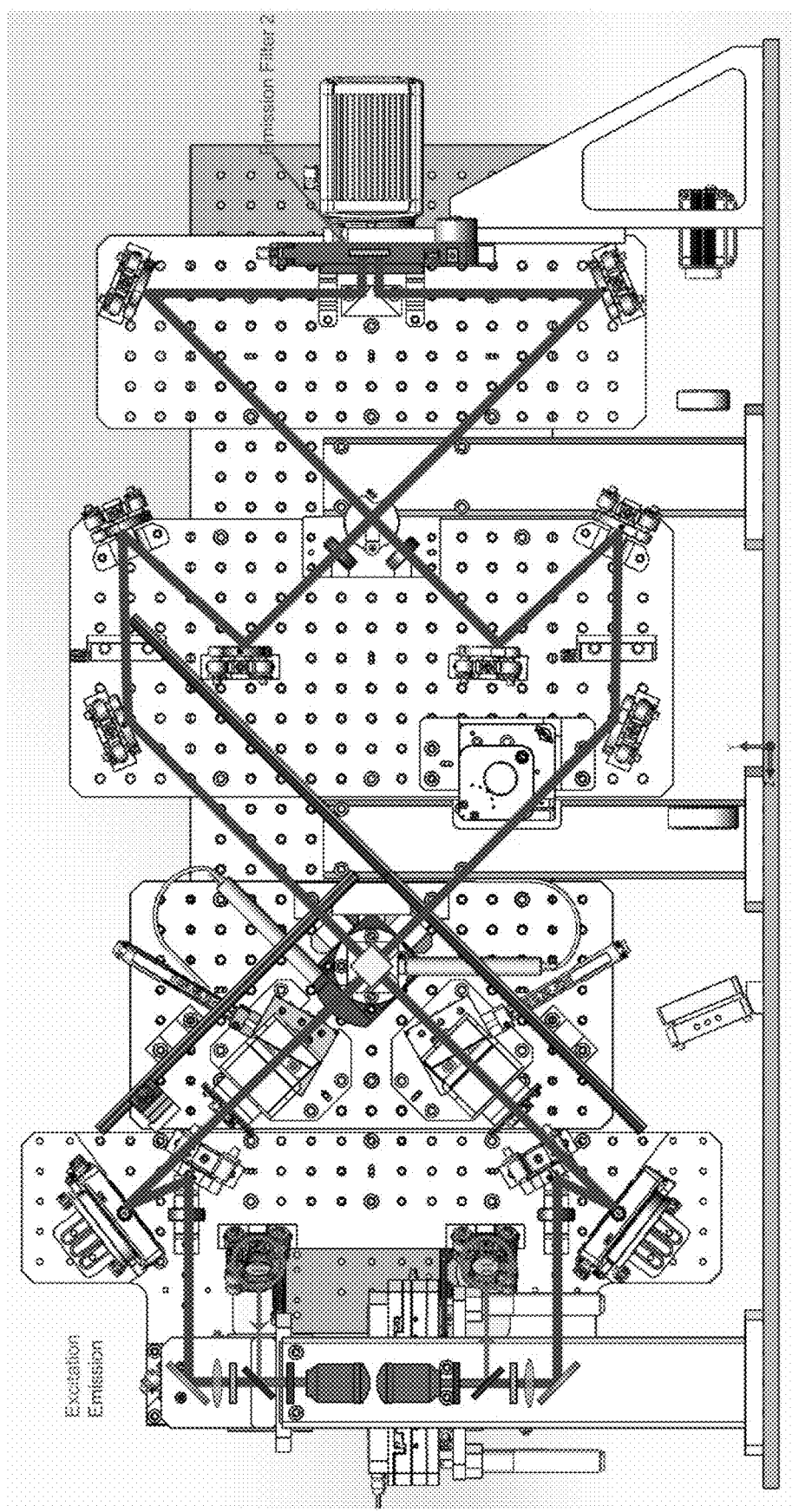
FIG. 1 shows a schematic drawing of the front side of a 4Pi-SMS system. The excitation laser (green solid lines) comes from the back side of the system (IN), passes through the objectives and samples and goes back to the back side of the system (OUT).
Figure 2A:
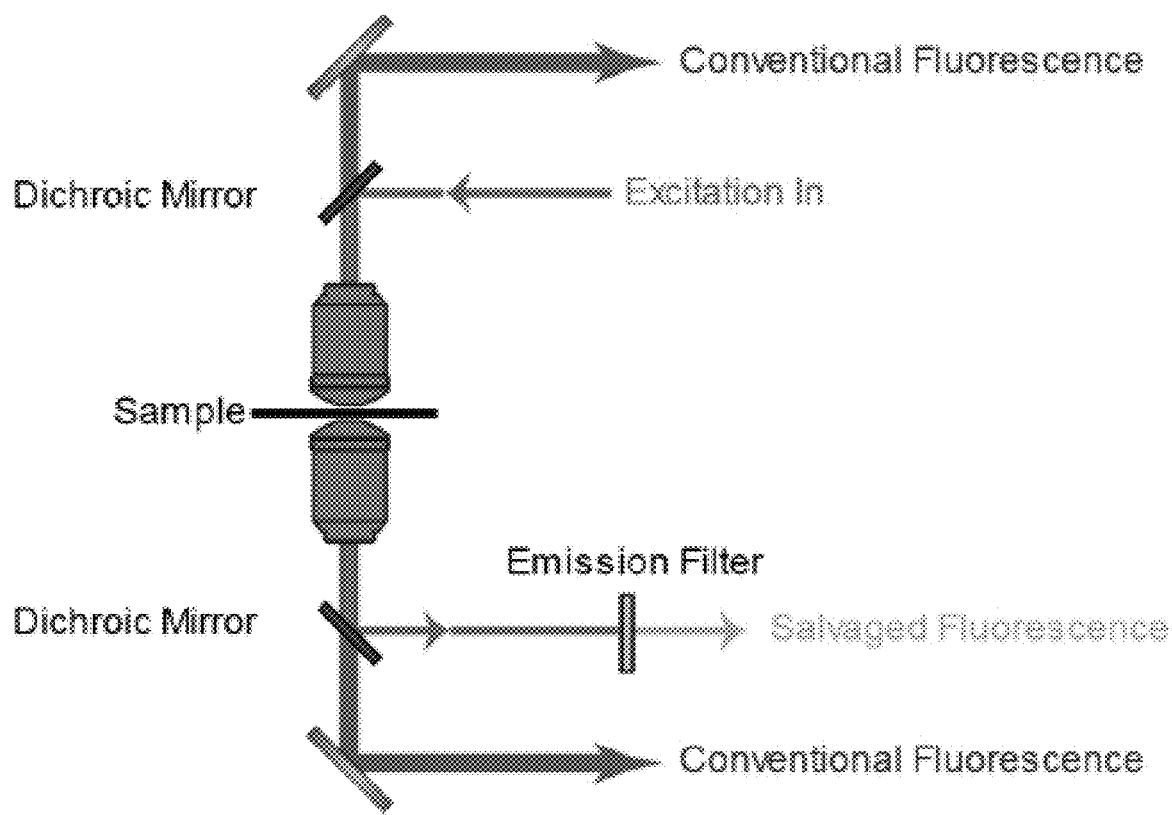
FIGS. 2A and 2B are confocal microscopy set-ups, according to certain embodiments of the invention, capable of simultaneous two-color imaging.
Figure 2B:
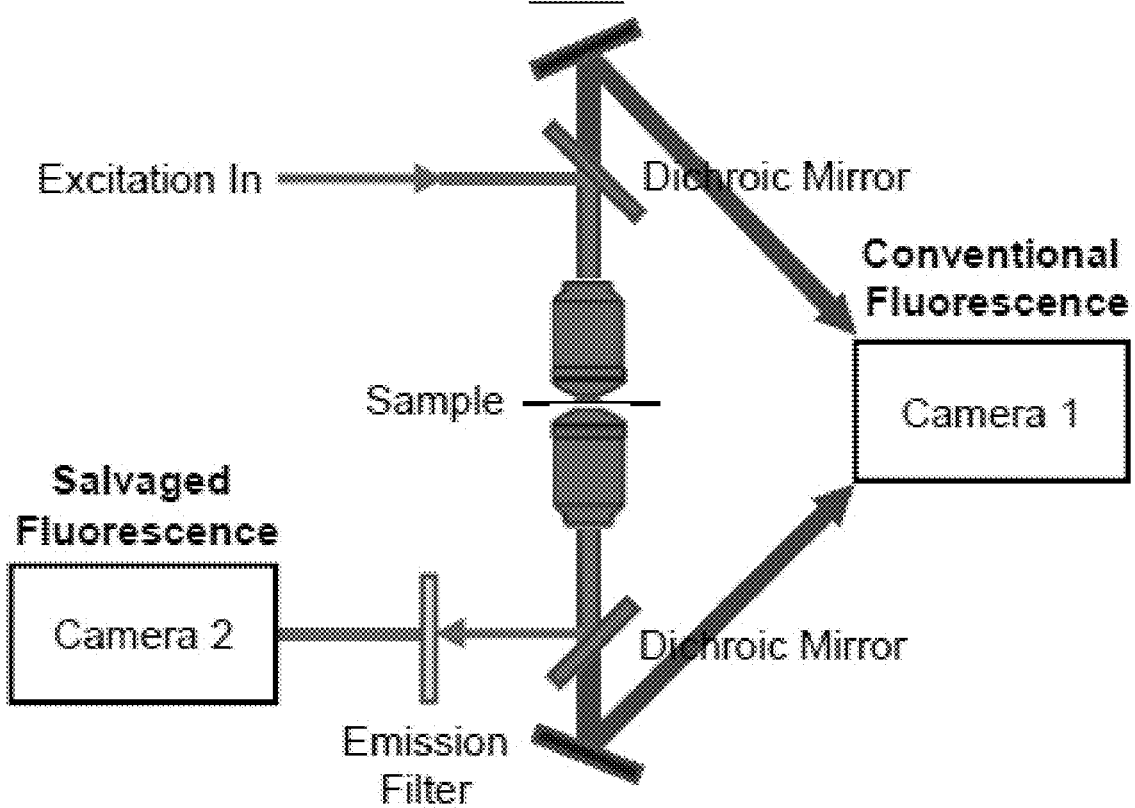
Figure 2C:
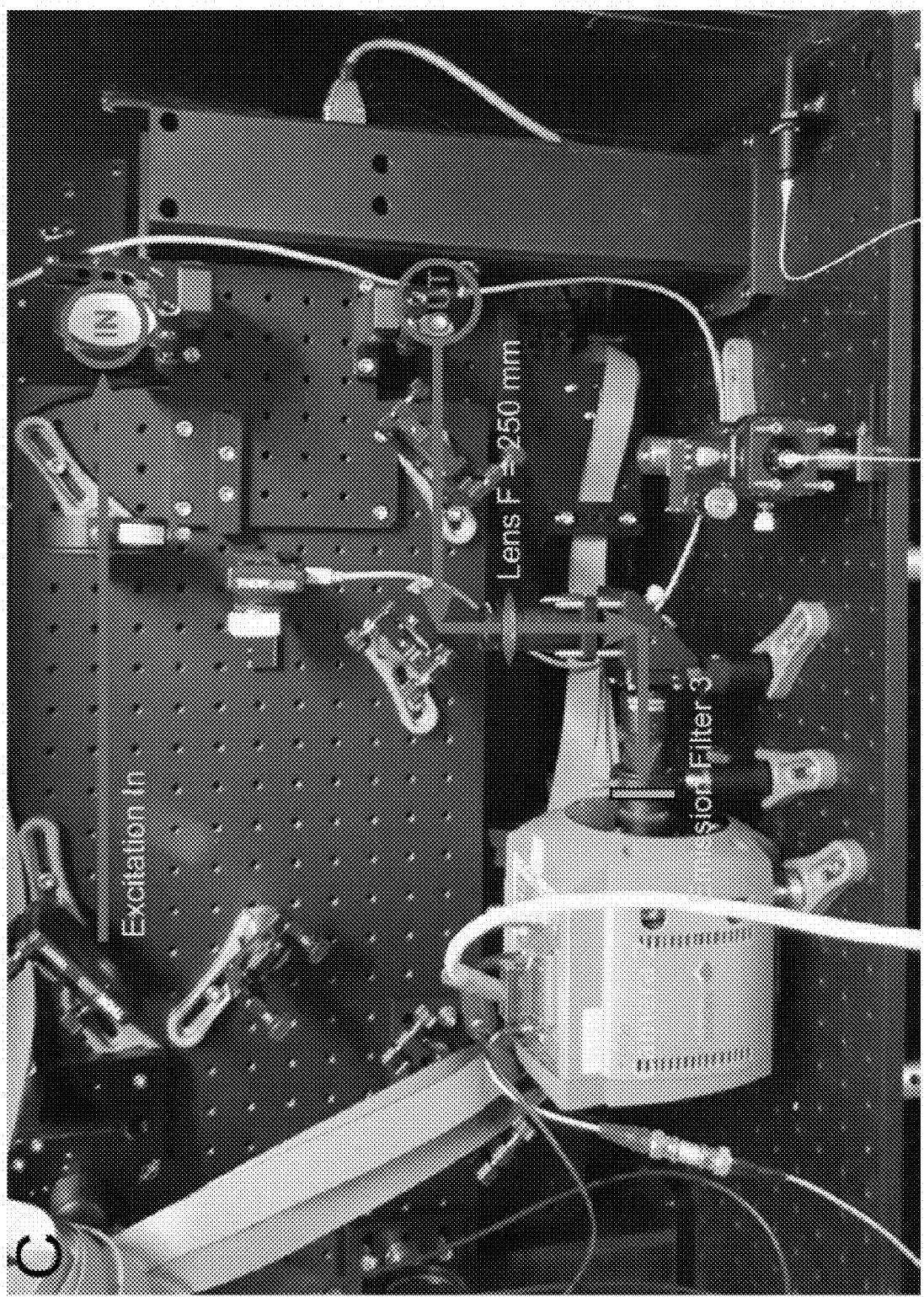
FIG. 2C is a picture of the back side of a 4Pi-SMS system of the invention. The IN and OUT indicate where the excitation laser goes to and comes back from the front side of the system. The EMCCD (camera 2) is used to the collect the salvaged fluorescence.
Figure 3A:
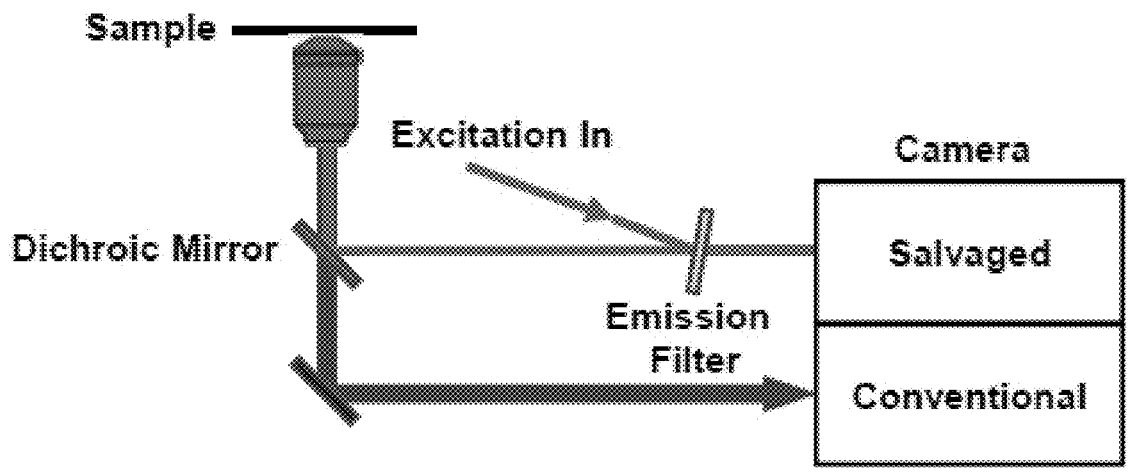
FIGS. 3A and 3B are single objective fluorescence microscopy set-ups, according to certain embodiments of the invention, capable of simultaneous two-color imaging.
Figure 3B:
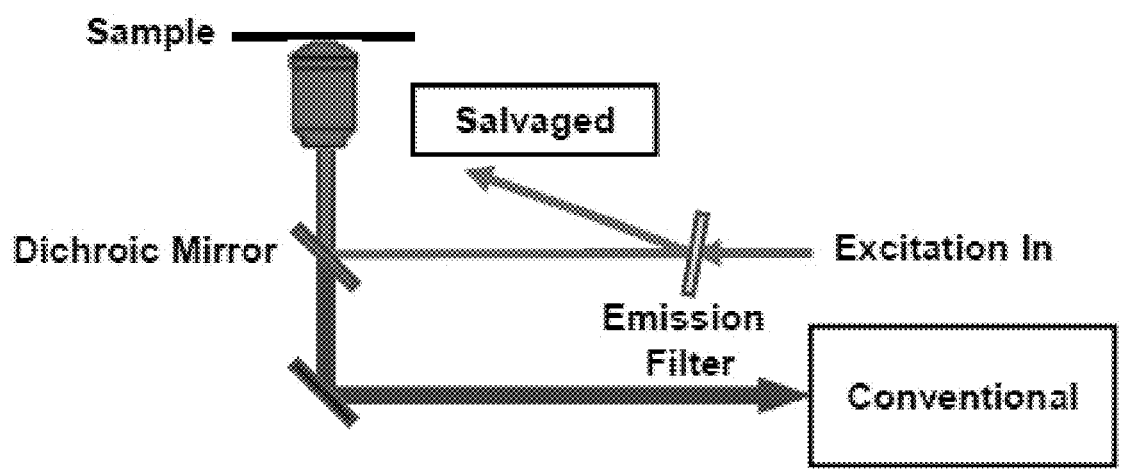
Figure 4A:
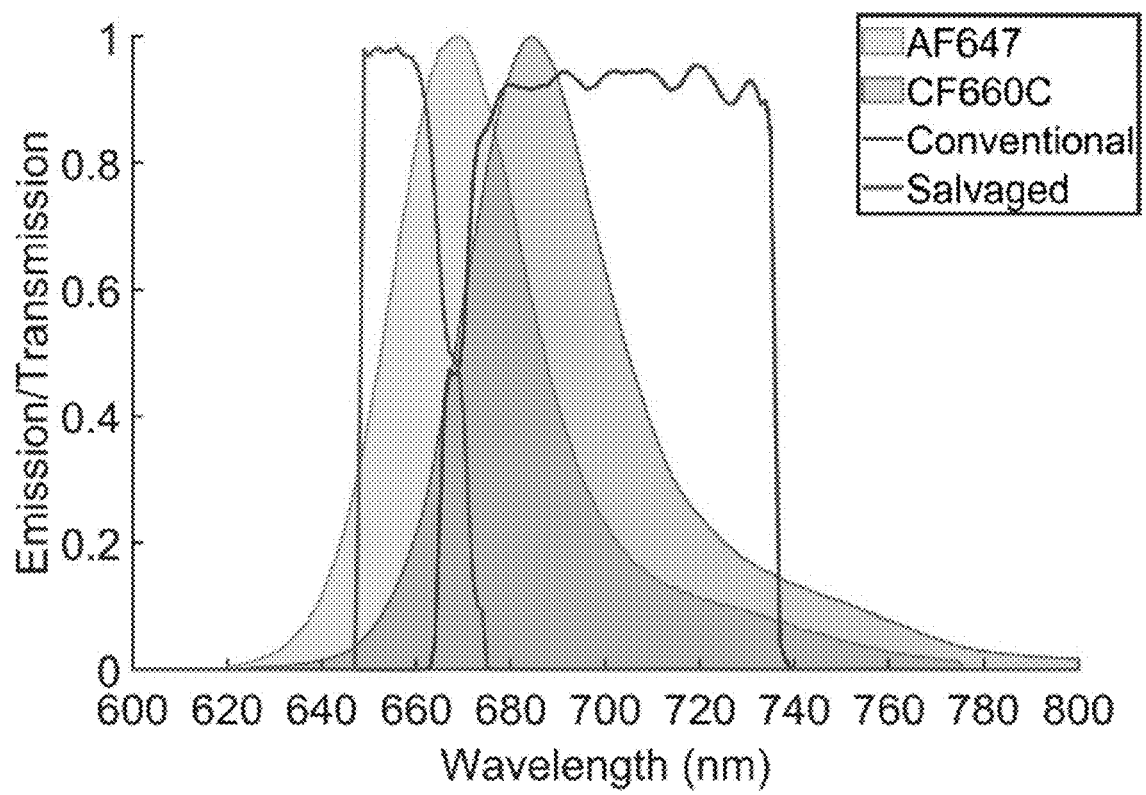
FIG. 4A is the emission spectrum of AF647 and CF660C dyes, and collection windows for conventional and salvaged fluorescence collected by the methods of the invention.
Figure 4B:
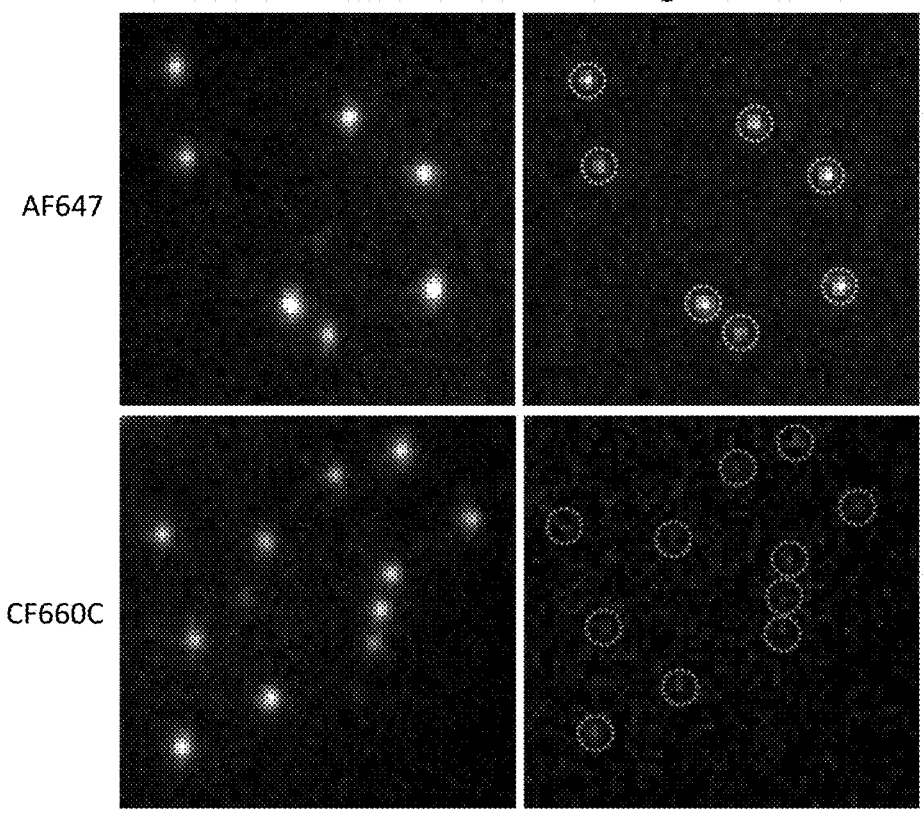
FIG. 4B is a set of images showing conventional and salvaged fluorescence images of single molecules labeled with AF647 or CF660C. The dashed circles indicate the corresponding mapping positions of single molecules in the salvaged fluorescence images from the localized positions in the conventional fluorescence images.
Figure 5A:
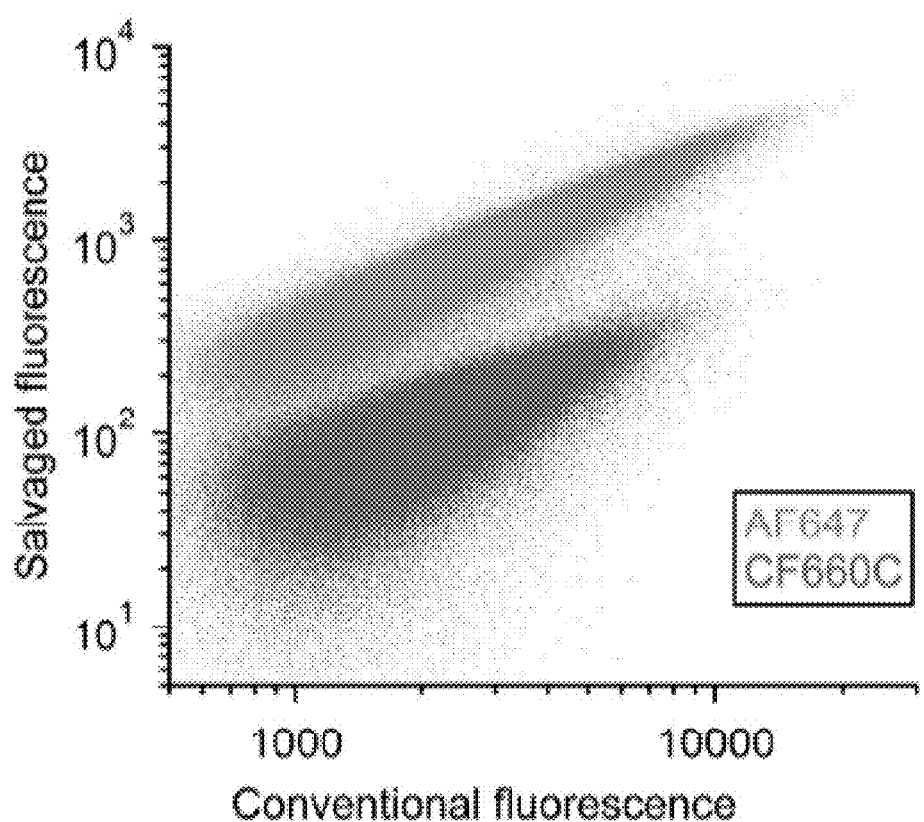
FIG. 5A is a plot of salvaged fluorescence vs. conventional fluorescence intensities of single molecules labeled with AF647 or CF660C.
Figure 5B:
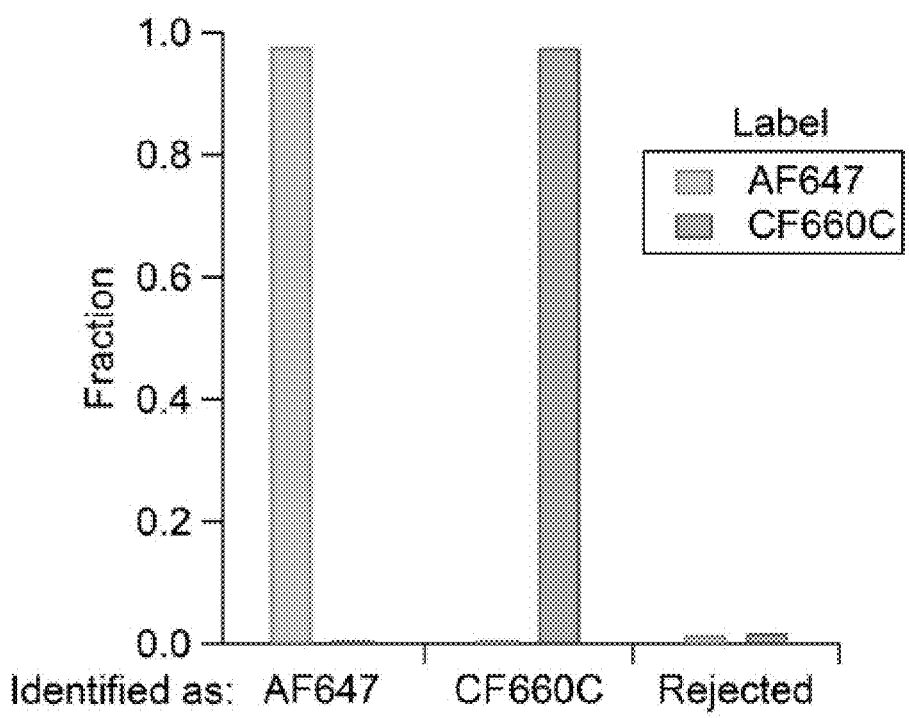
FIG. 5B is a graph showing cross-talk between AF647 and CF660C. The cross-talks are below 1% when about 2% of the total molecules are rejected.
Figure 5D:
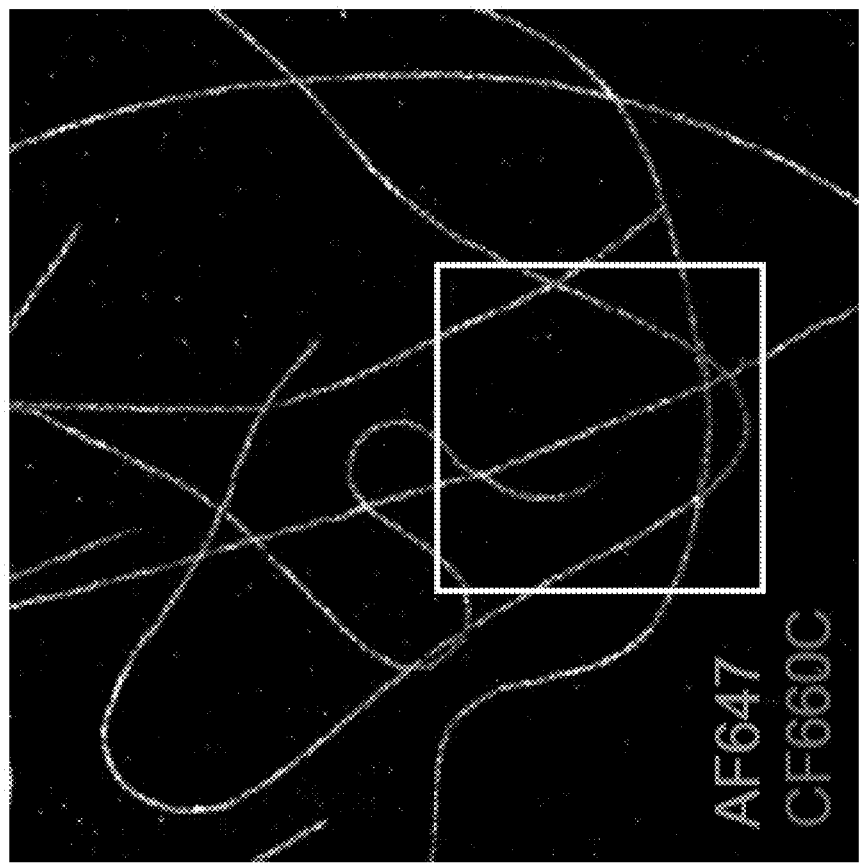
FIGS. 5C-5E are two-color 4Pi-SMS images of microtubules (a-tubulin antibody labeled with AF647 and CF660C together) collected using methods of the invention.
Figure 5C:
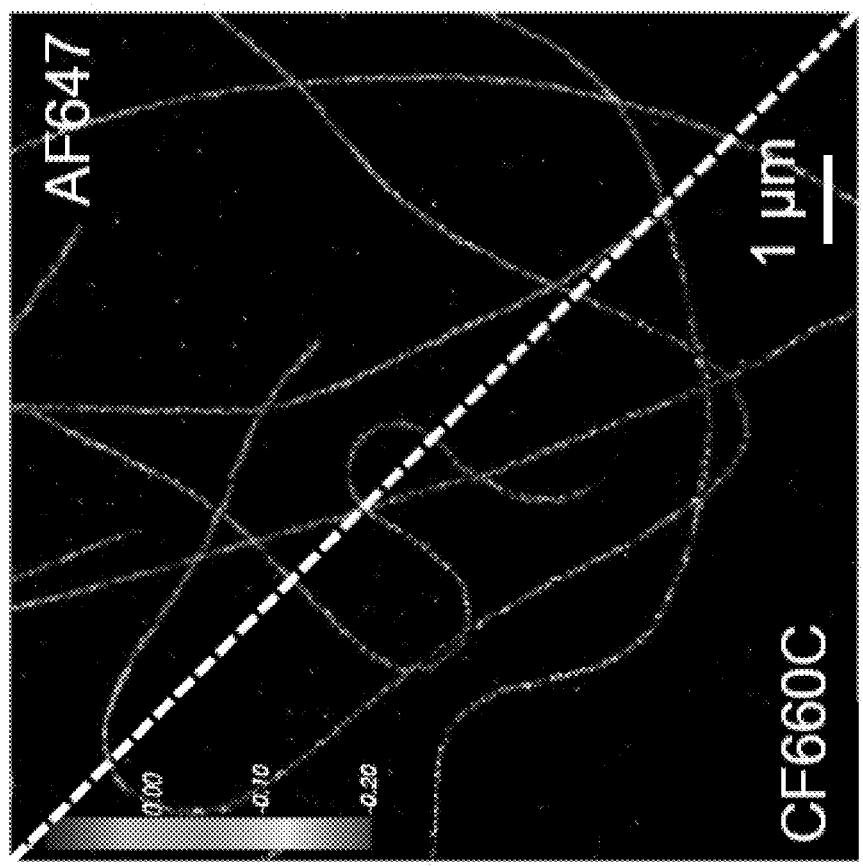
Figure 5E:
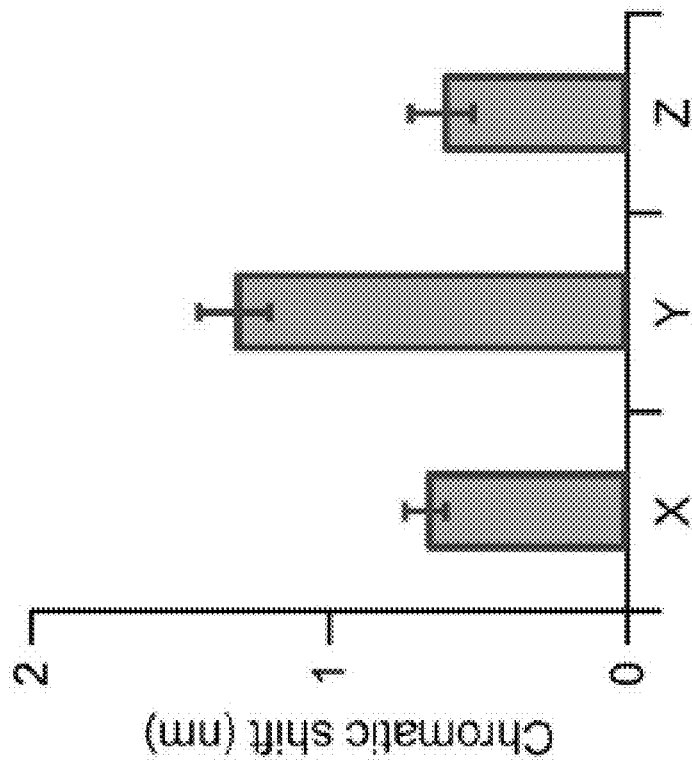
Figure 5F:
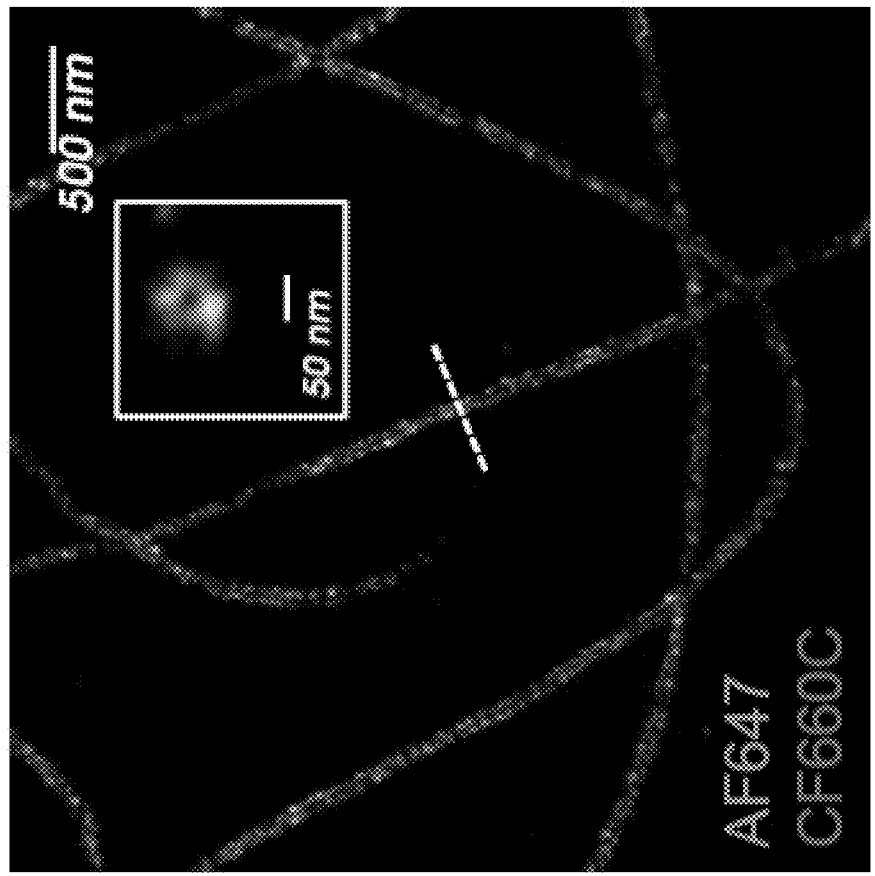
FIG. 5F is a graph showing the chromatic shift between AF647 and CF660C in each dimension (<2 nm) for the images shown in FIGS. 5C-5E. Data are presented as mean±SEM (n=23).
Figure 7B:
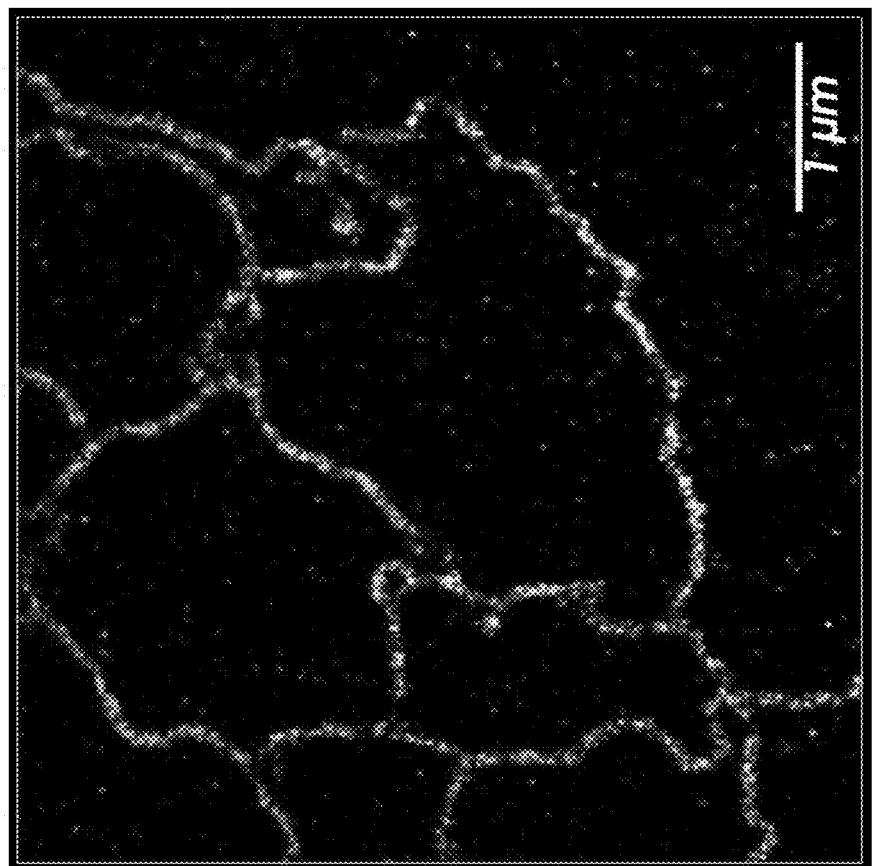
FIGS. 7A-7E are two-color 4Pi-SMS images of ER in COS-7 cells overexpressing GFP-Sec610 and mCherry-KDEL. The ER membrane is labeled with anti-GFP antibody and CF660C labeled secondary antibody (FIG. 7A) and the ER lumen is labeled with anti-RFP nanobody conjugated to AF647 (FIG. 7B).
Figure 7A:
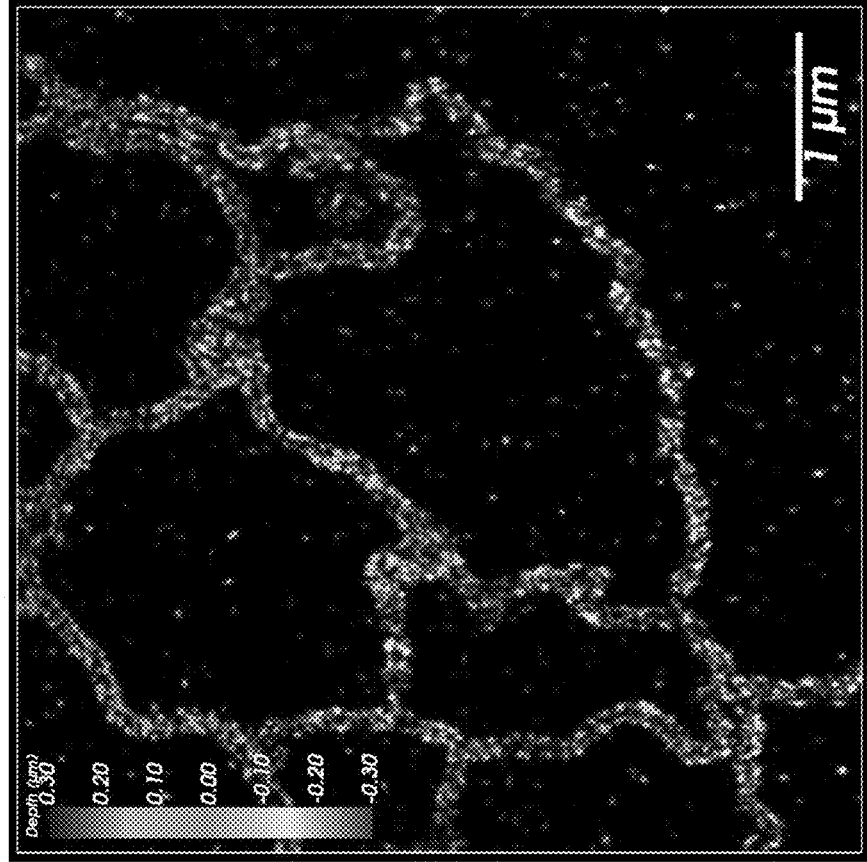
Figure 7C:
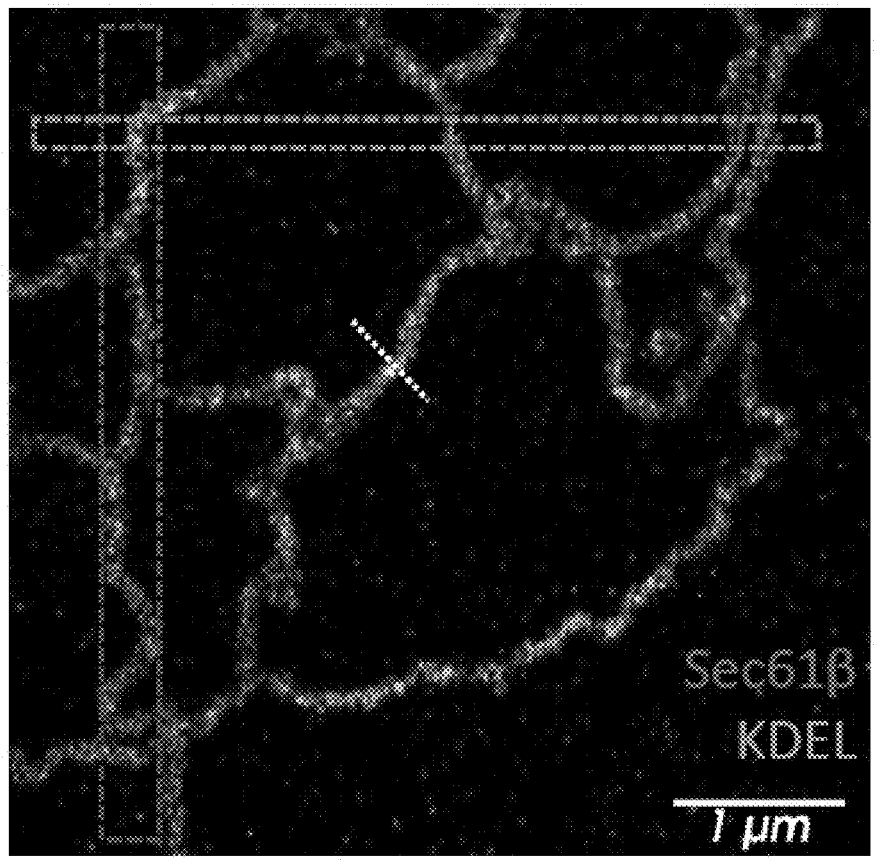
Figure 7D:
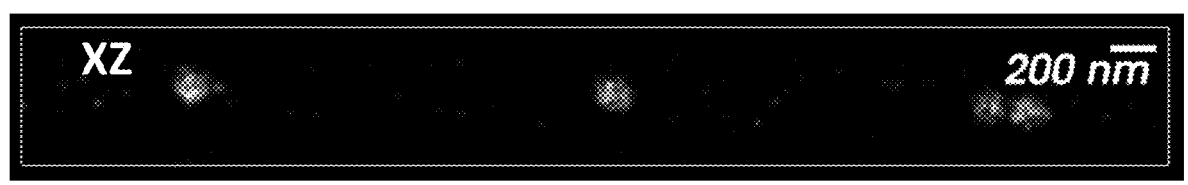
Figure 7E:
Figure 7F:
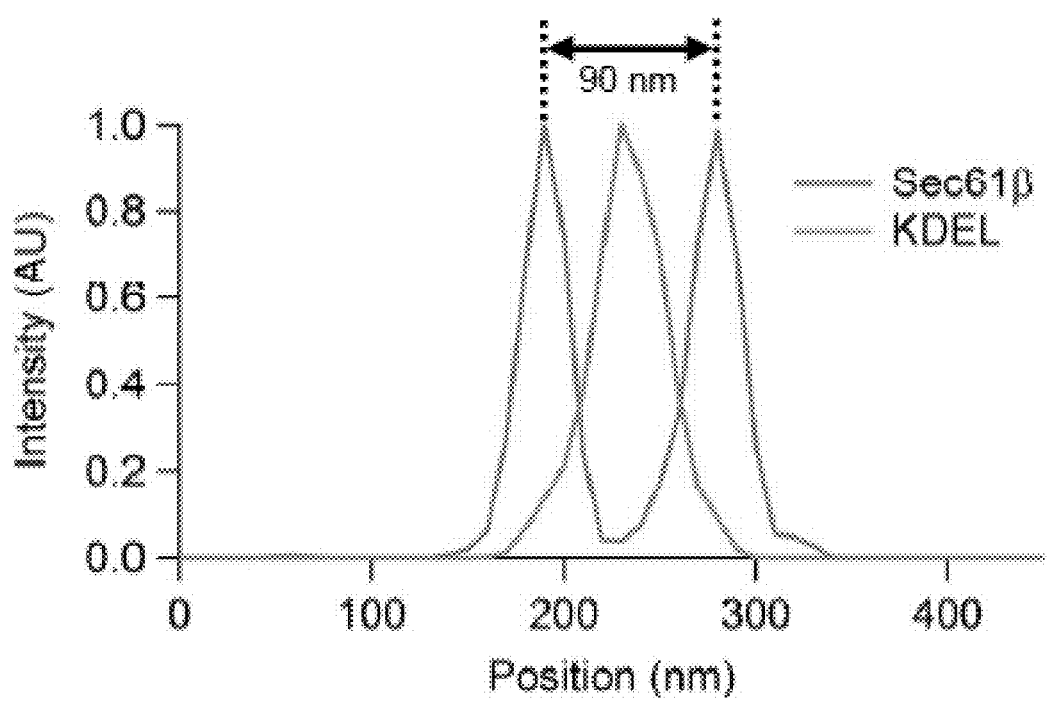
FIG. 7F is a graph showing the fluorescence intensity profile along the dashed line in FIG. 7C.
Figure 8:
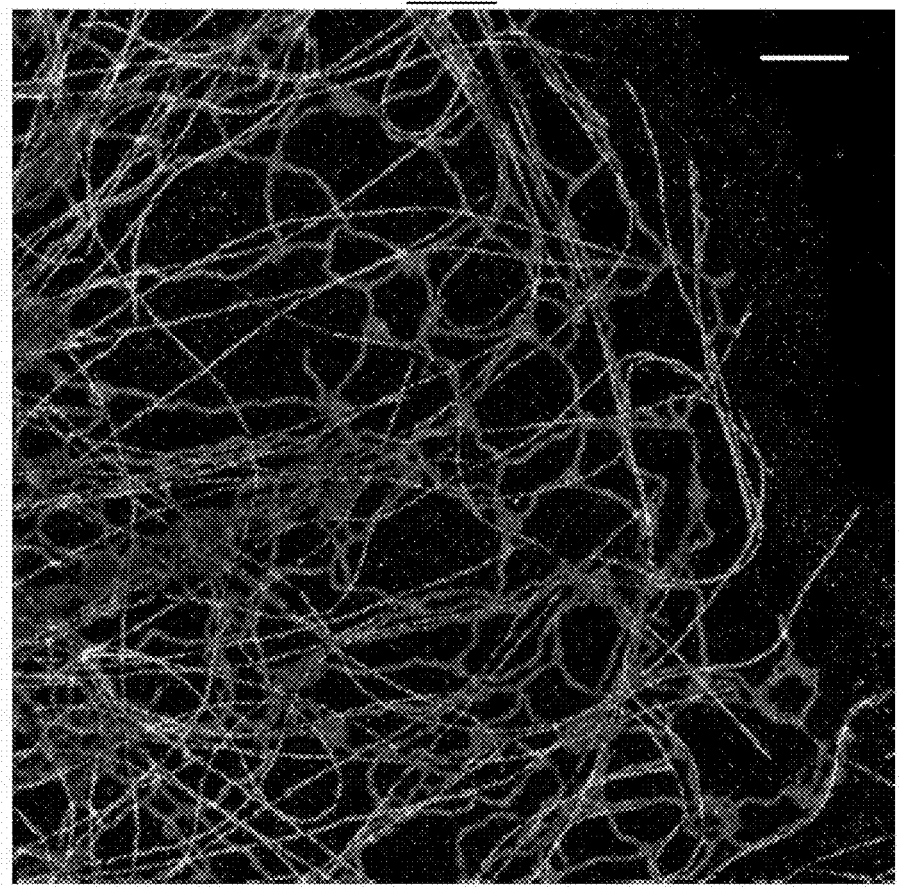
FIG. 8 is a two-color image of ER and microtubules obtained with a single objective fluorescence microscopy set-up of the invention.
Figures 9A, 9B:
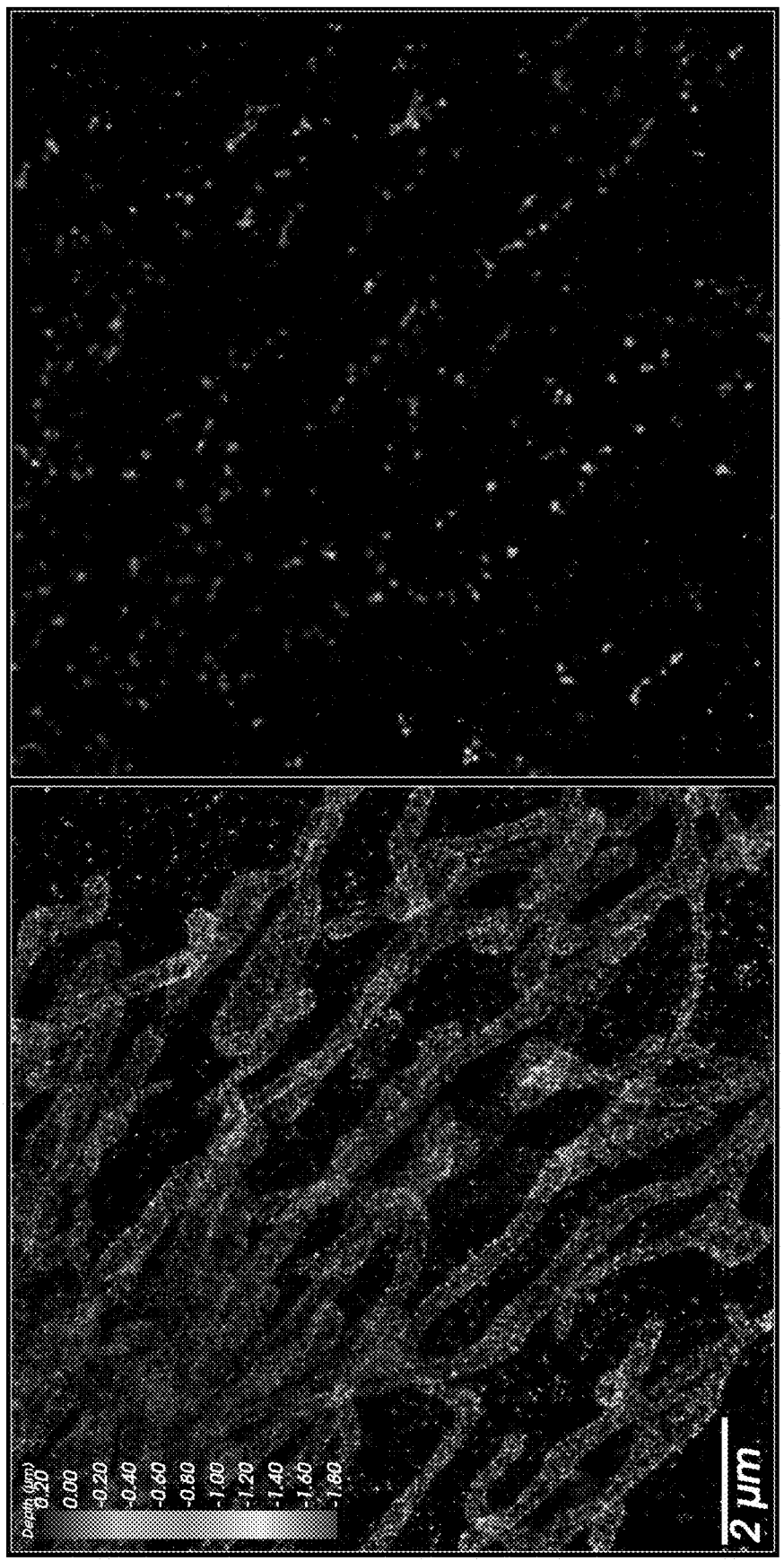
FIGS. 9A-9G are two-color 4Pi-SMS images of mitochondria in HeLa cells.
Figure 9D:
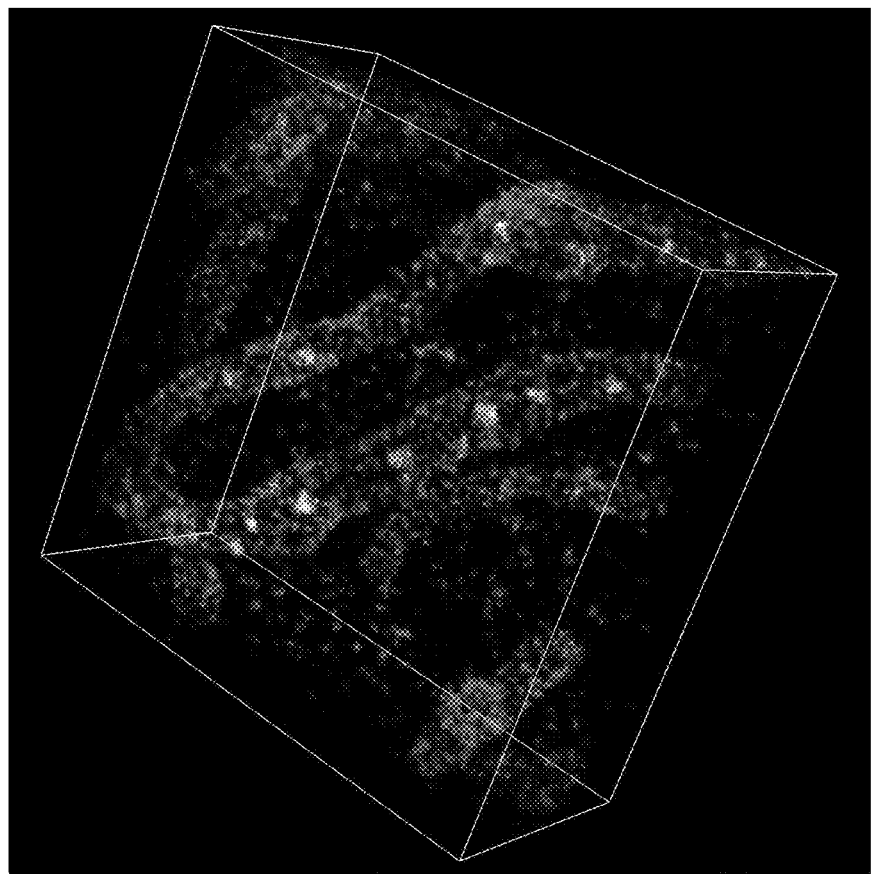
Figure 9C:
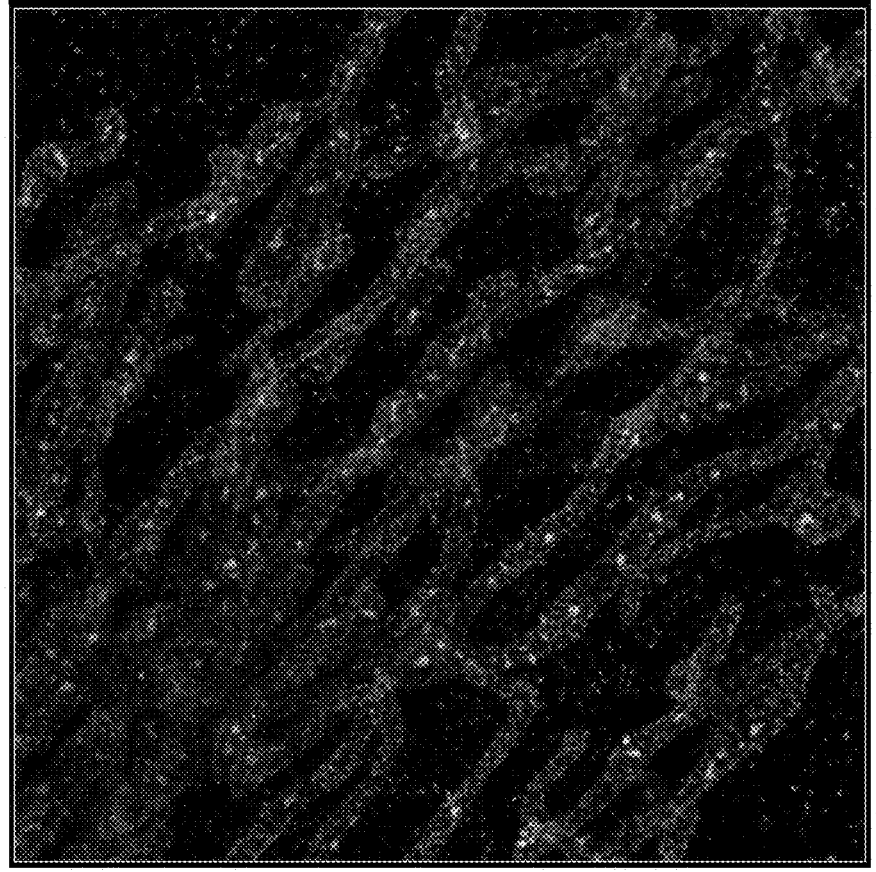
Figure 9F:
Figure 9G:
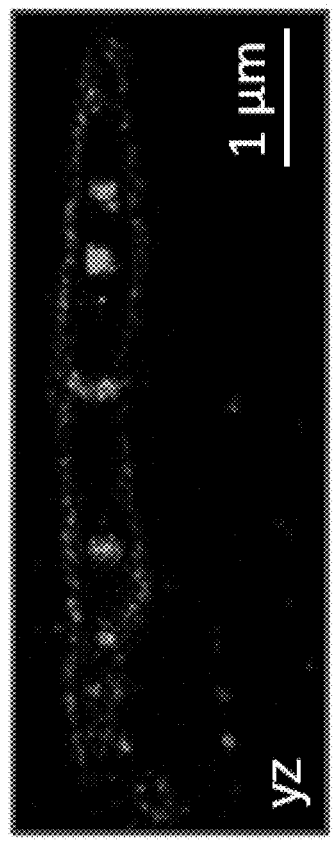
Figure 9E:
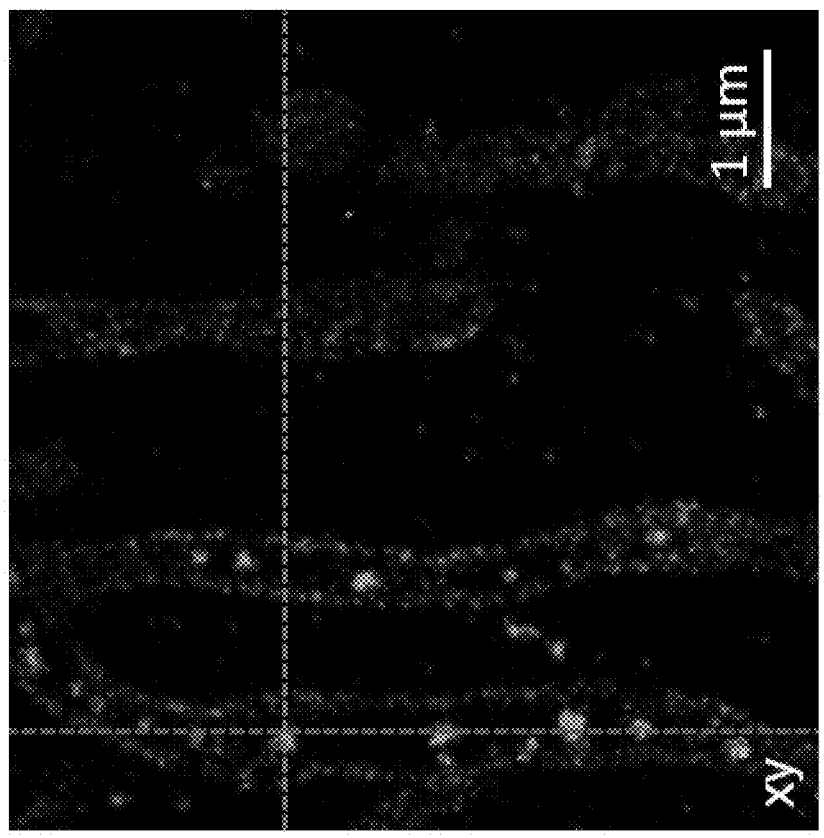
Figure 10B:
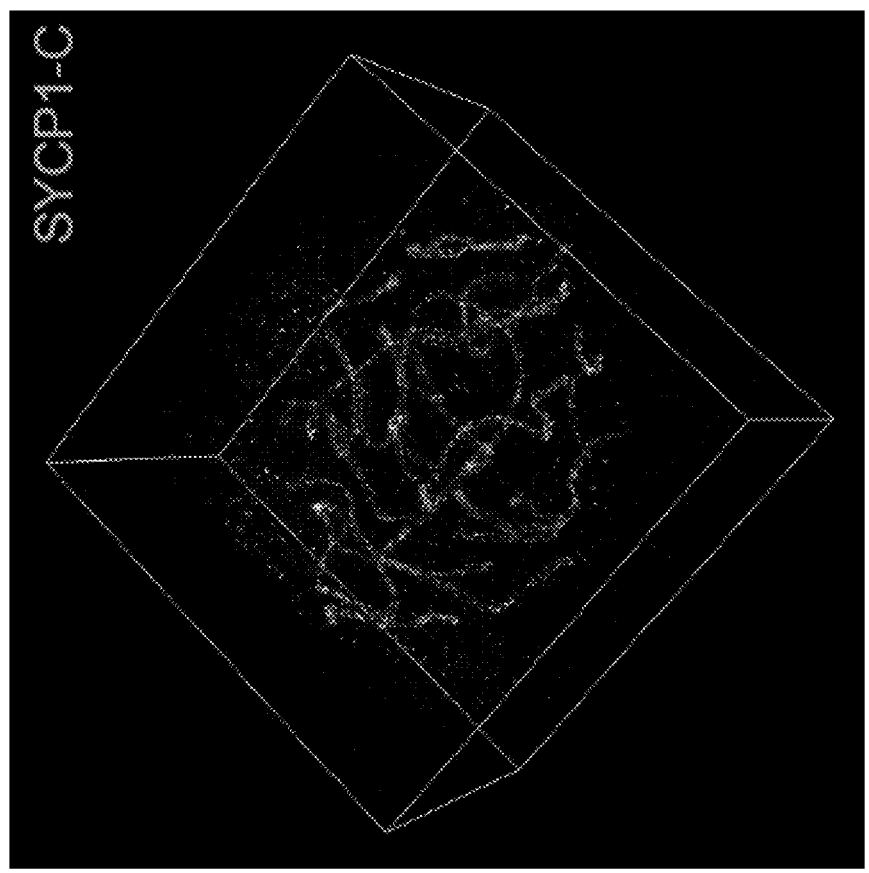
FIG. 10B is an overview image of the synaptonemal complexes labeled with SYCP1-C terminal antibody and CF660C labeled secondary antibody.
Figure 10A:
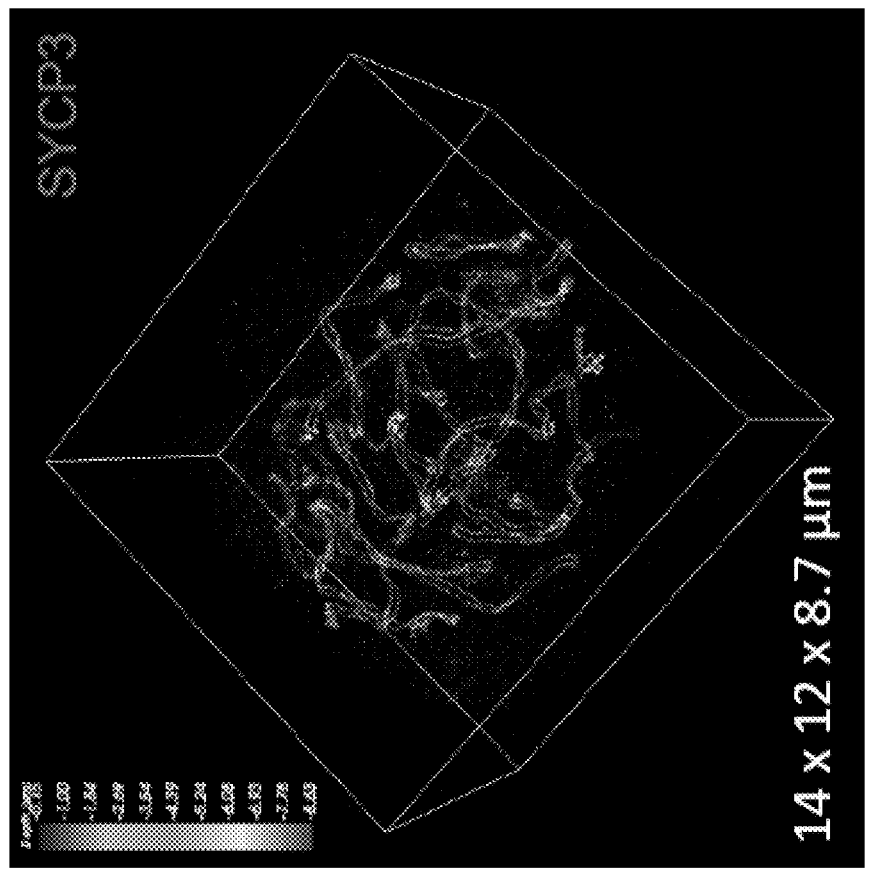
FIGS. 10A-10P are two-color 4Pi-SMS imaging of synaptonemal complexes in mouse spermatocytes.
Figure 10C:
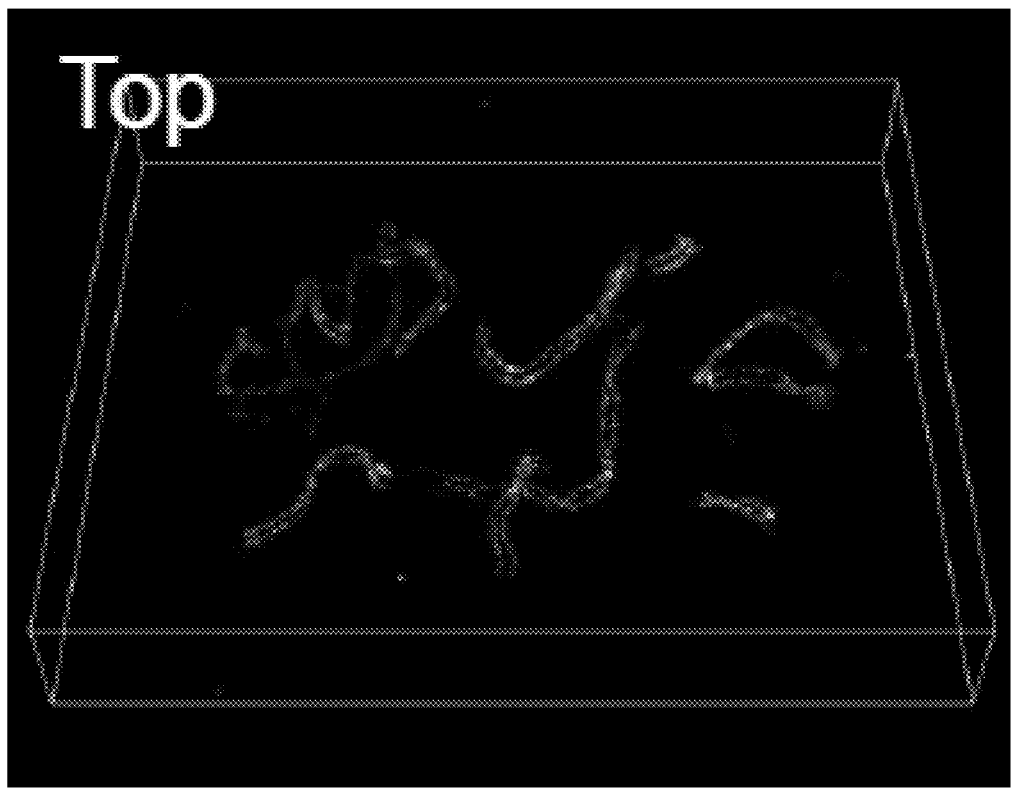
FIG. 10C is a set of 3D views of 2 µm thick z-slices at the top and bottom of the cell.
Figure 10C:
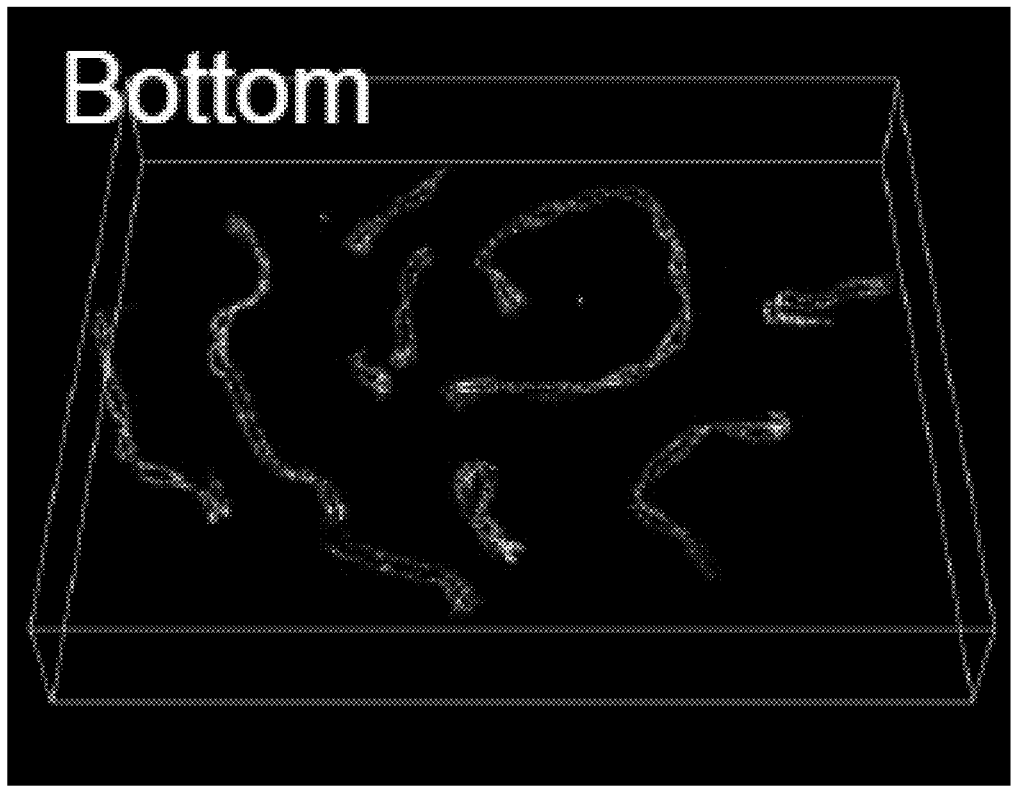
Figure 10D:
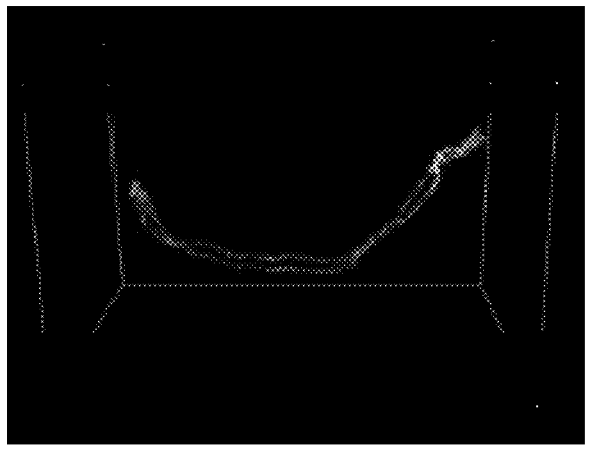
FIGS. 10D-10F are 3D views of one of the synaptonemal complexes.
Figure 10E:
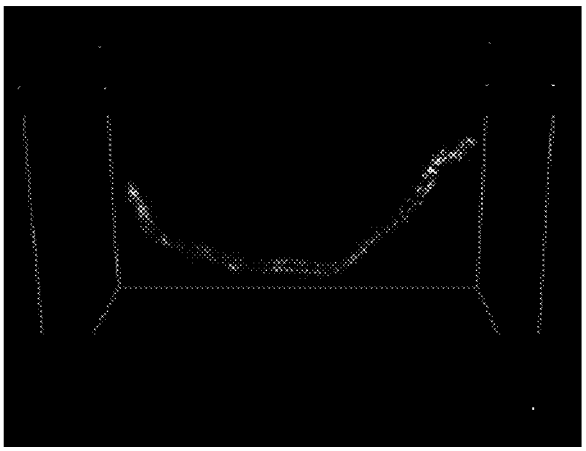
Figure 10F:
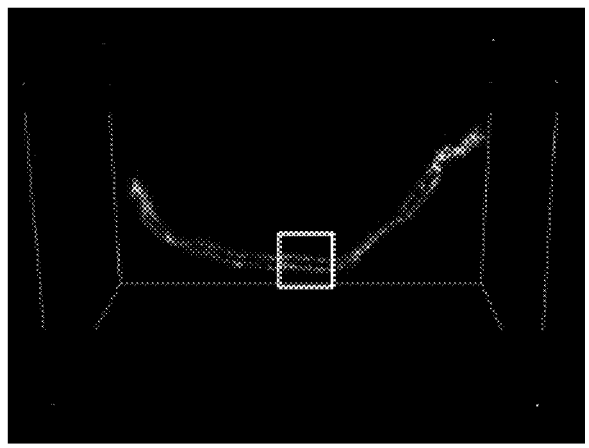
Figure 10G:
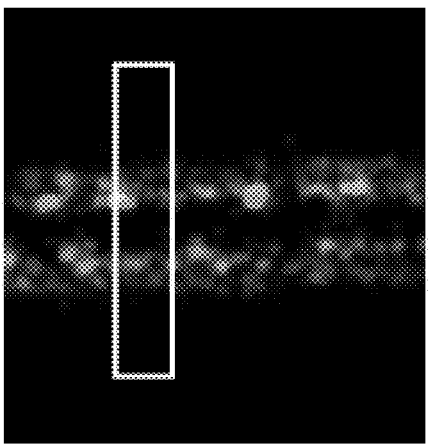
FIG. 10G is a magnified image of the box region in FIG. 10F.
Figure 10H:
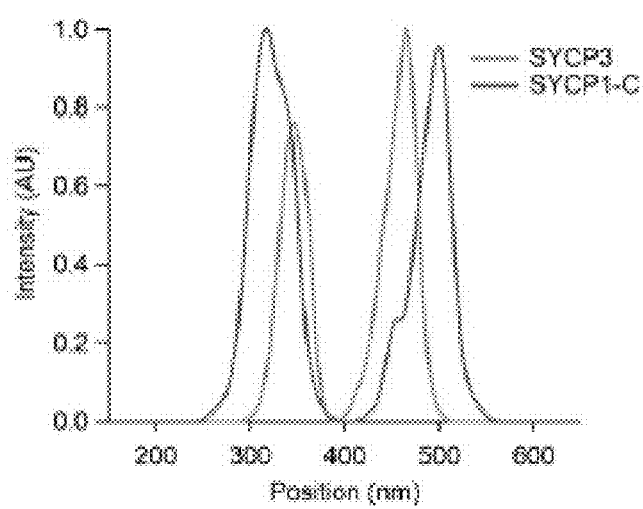
FIG. 10H is an intensity profile of the boxed region in FIG. 10G.
Figure 10J:
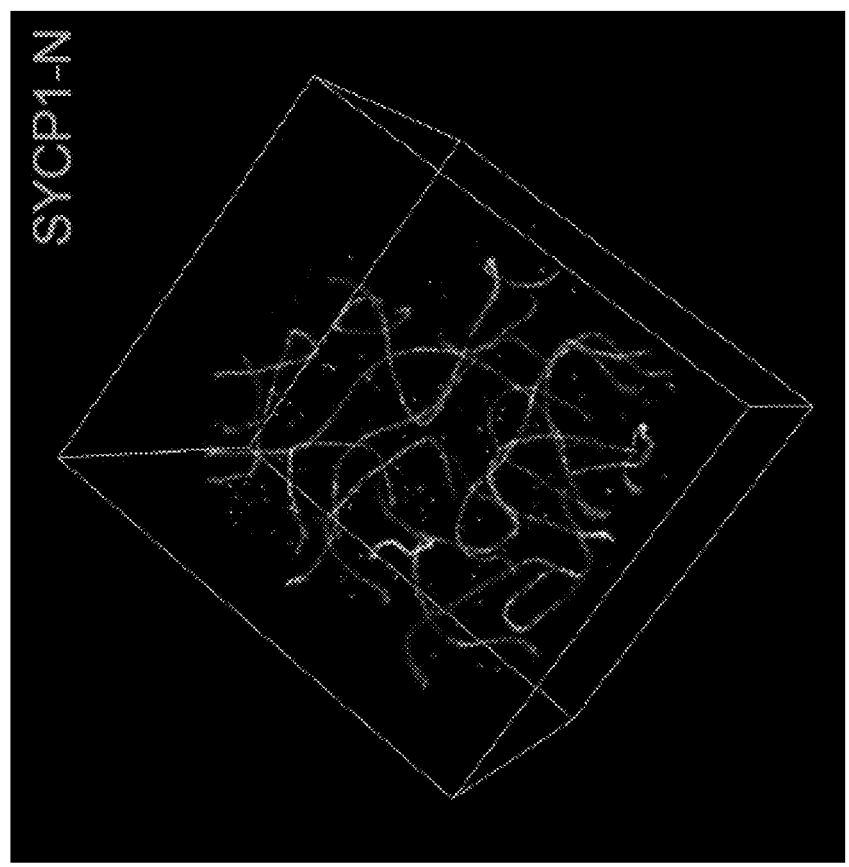
Figure 10I:
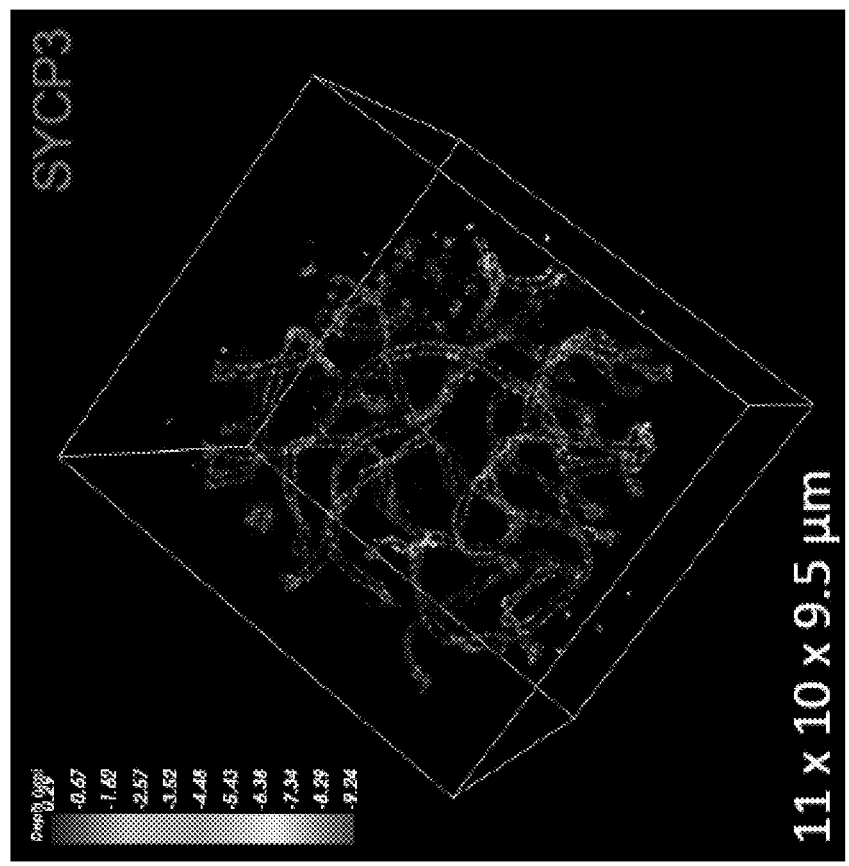
Figure 10K:
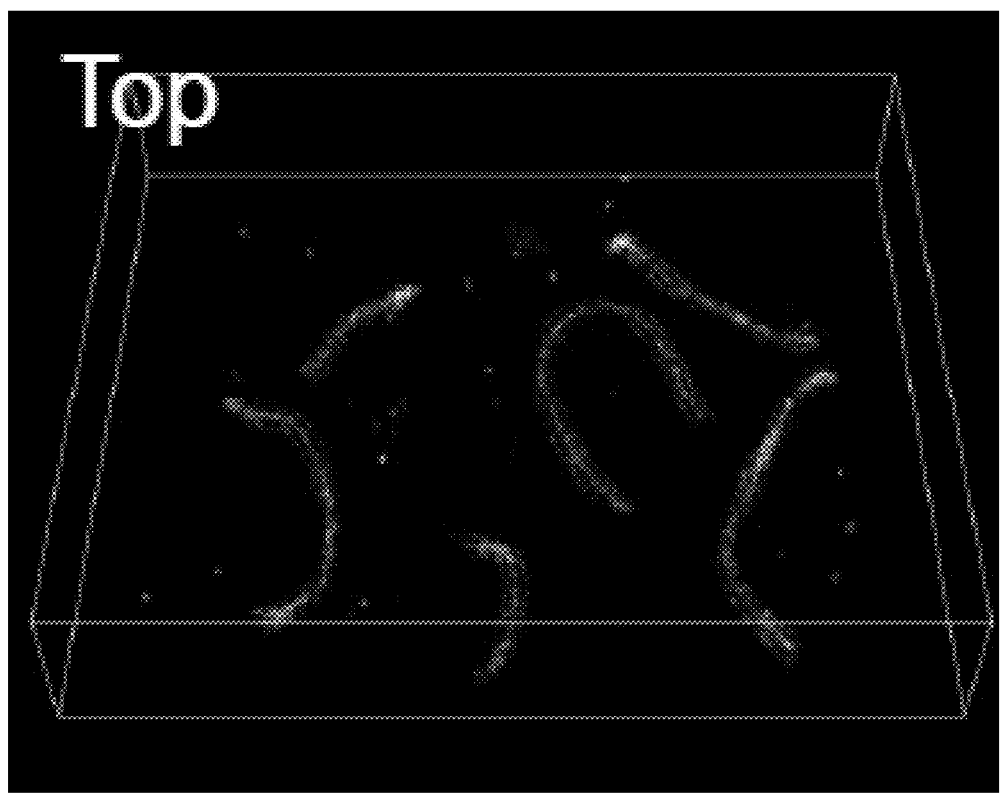
Figure 10K:
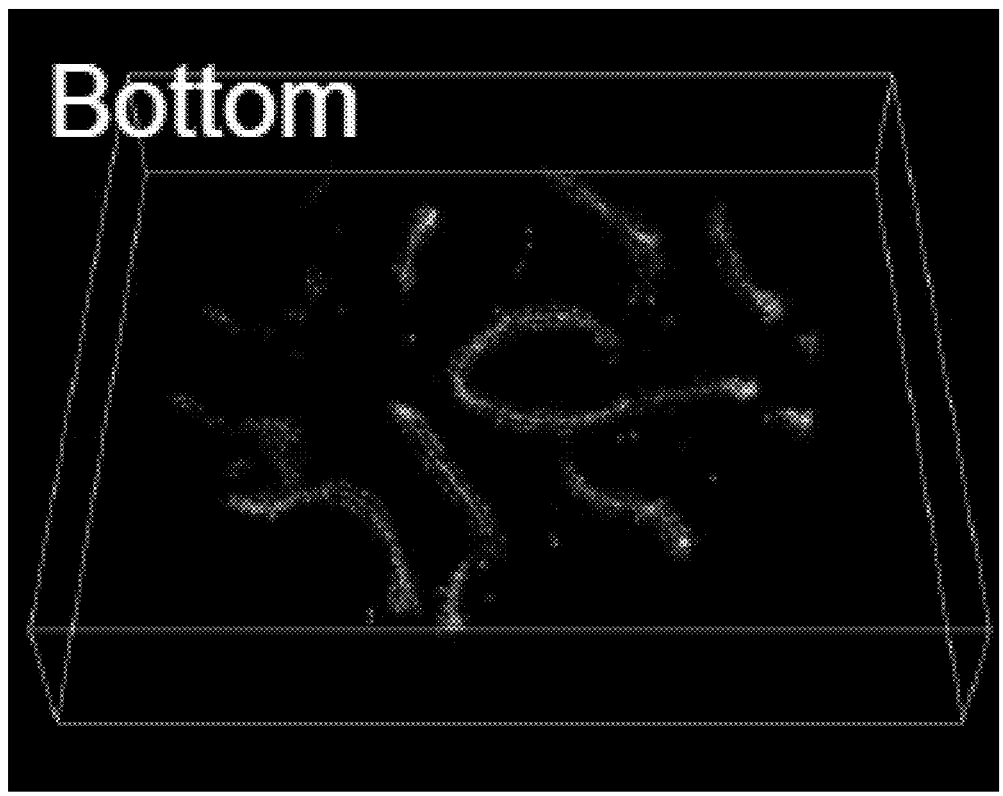
Figure 10L:
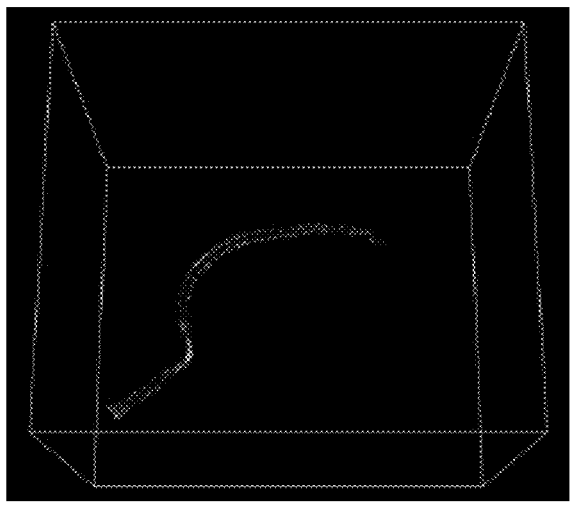
Figure 10M:
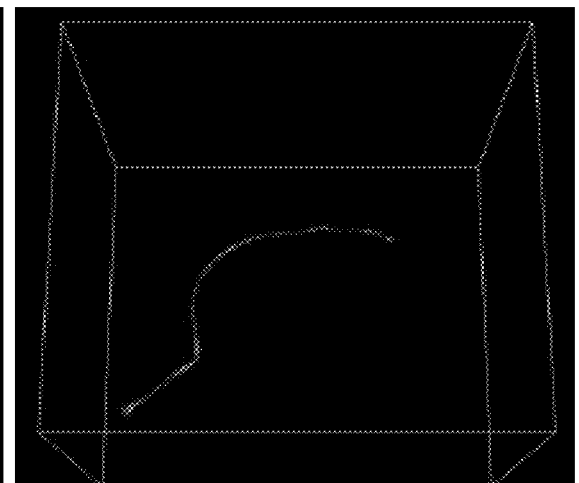
Figure 10N:
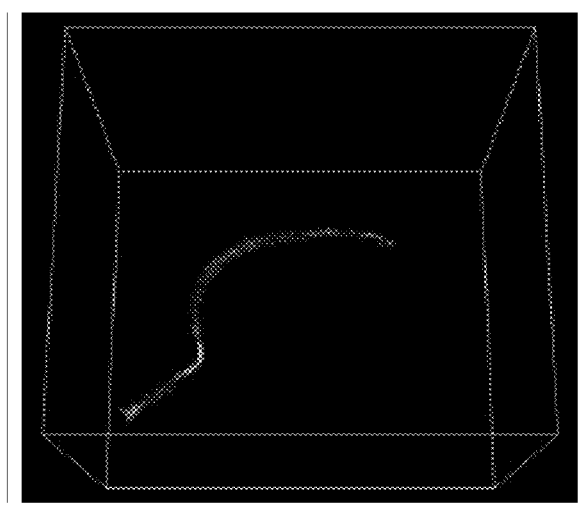
Figure 10O:
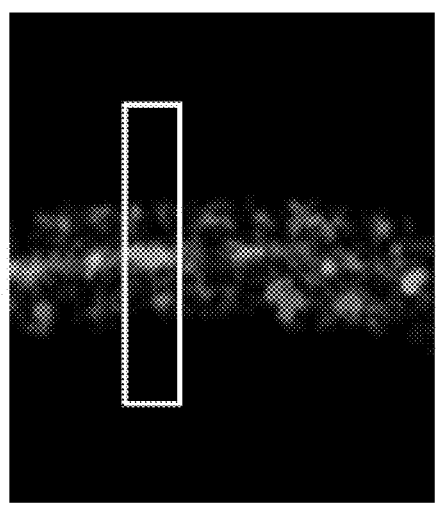
Figure 10P:
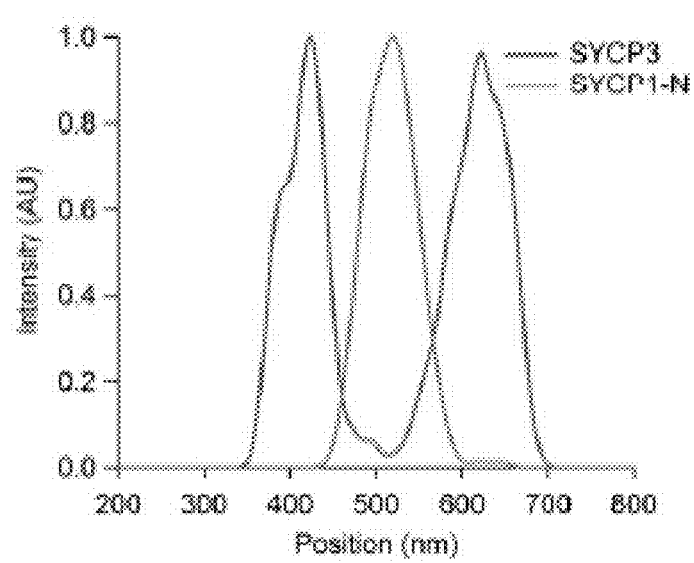
Figure 11A:
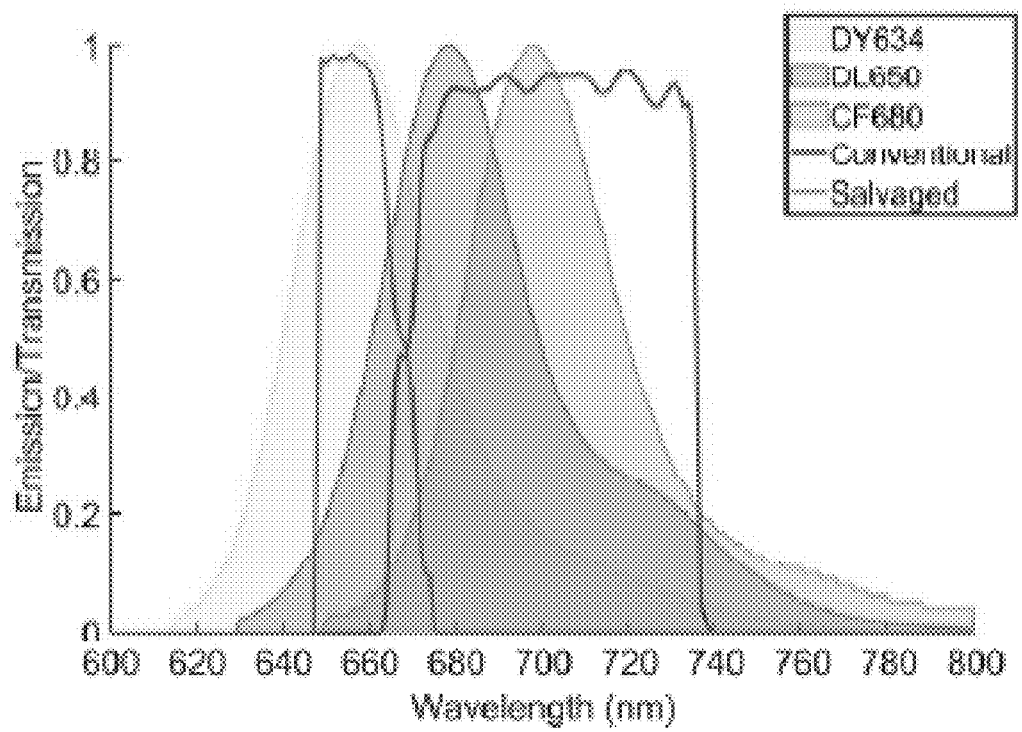
FIGS. 11A-11G are simultaneous three-color 4Pi-SMS images using salvaged fluorescence methods, according to an embodiment of the invention.
Figure 11B:
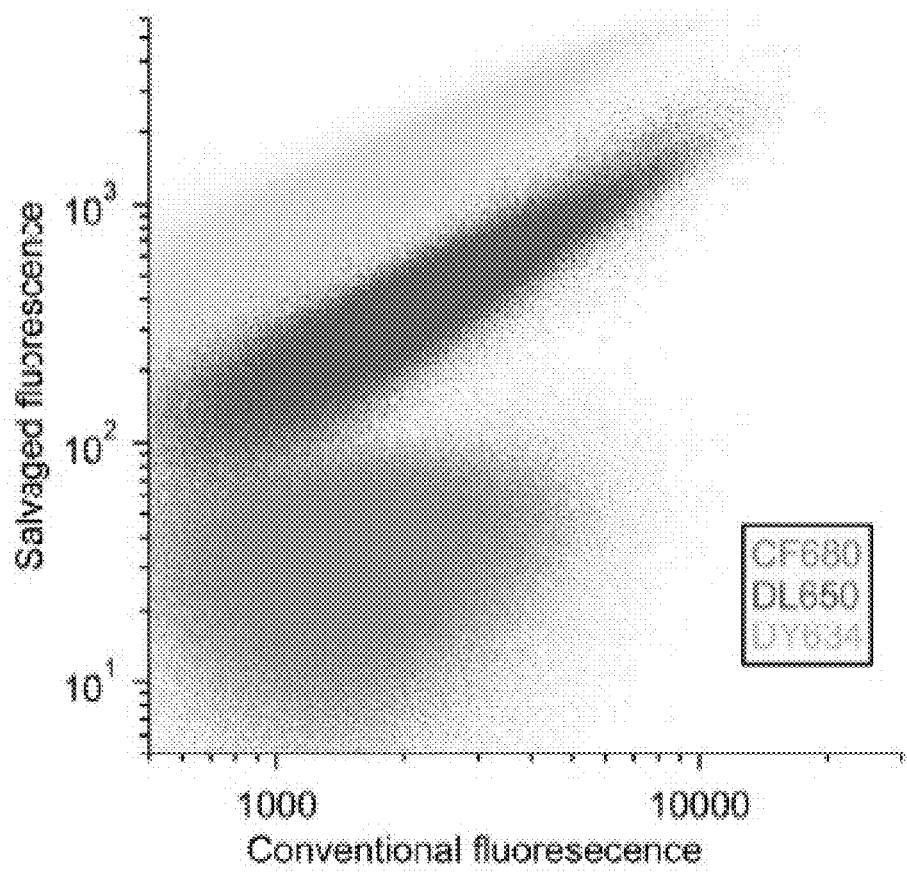
Figure 11C:
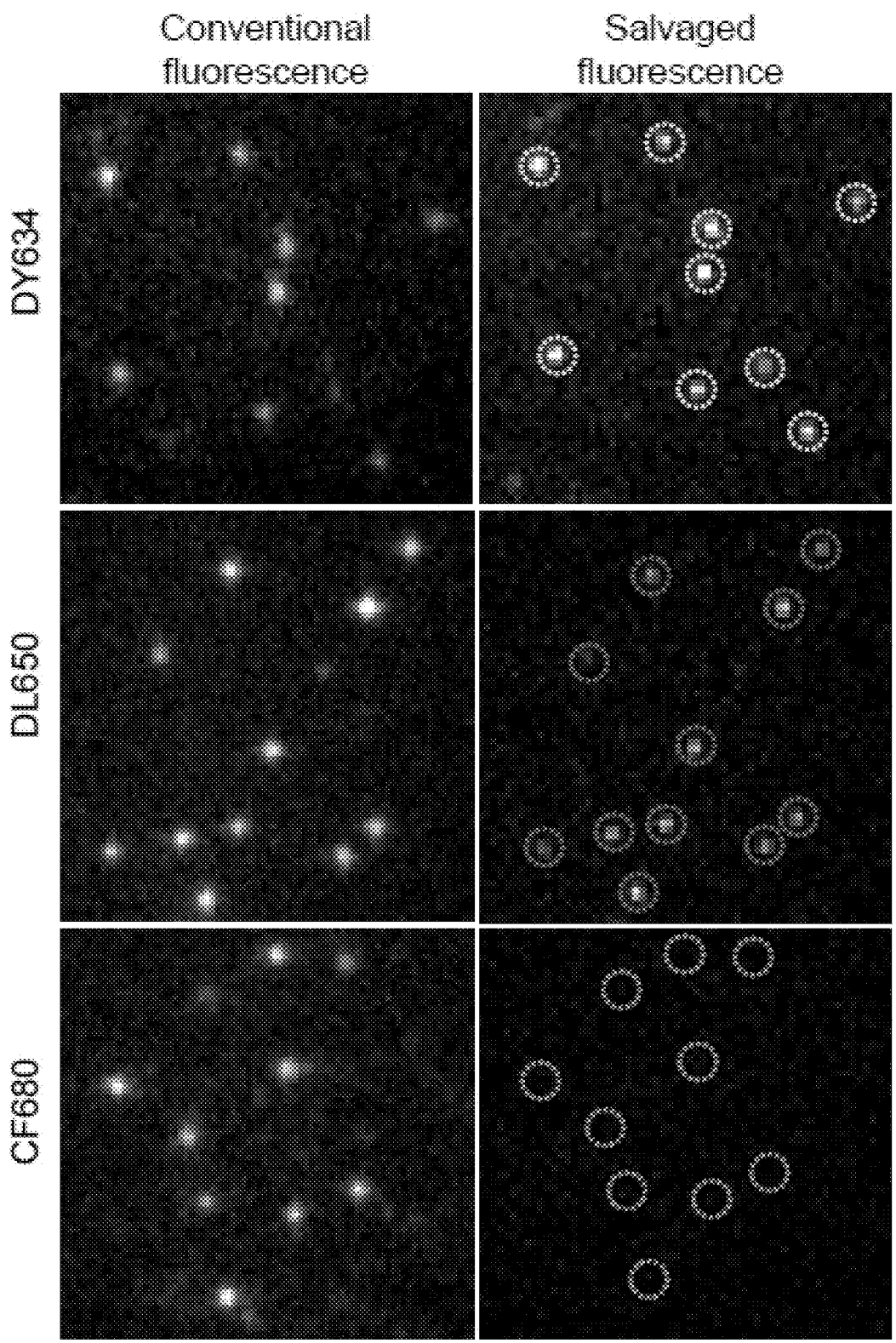
Figure 11E:
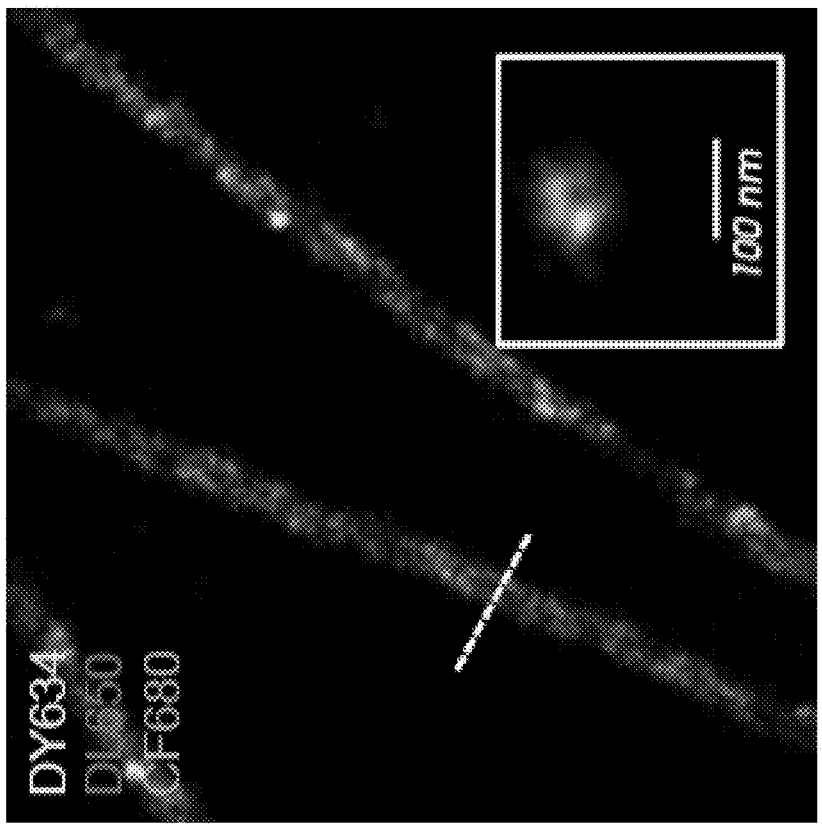
Figure 11D:
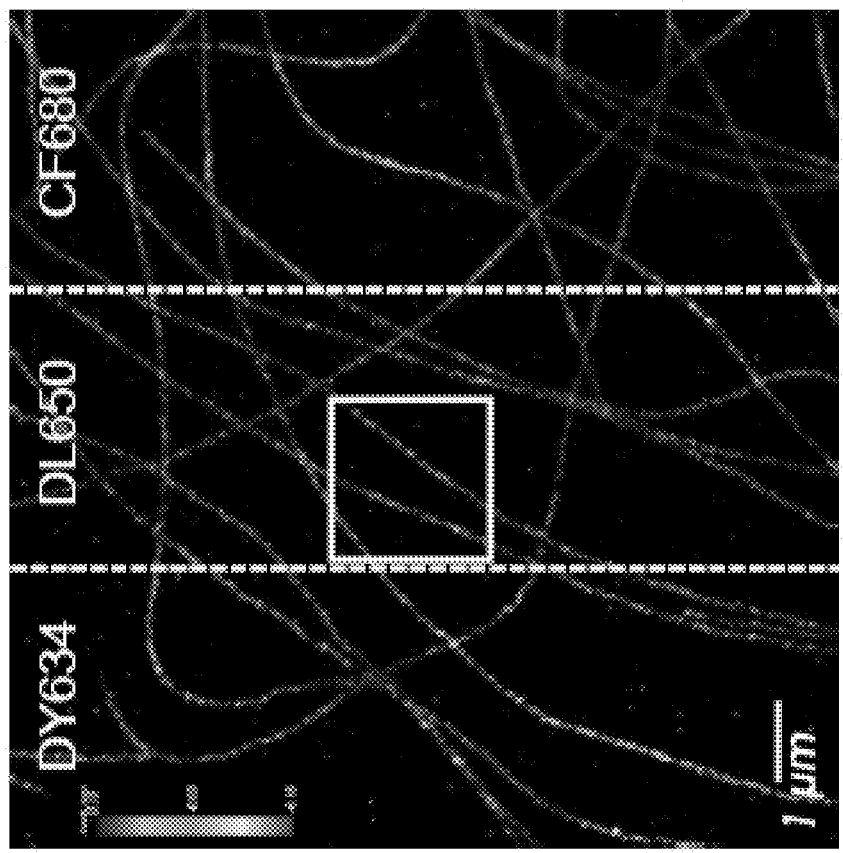
Figures 11F, 11G:
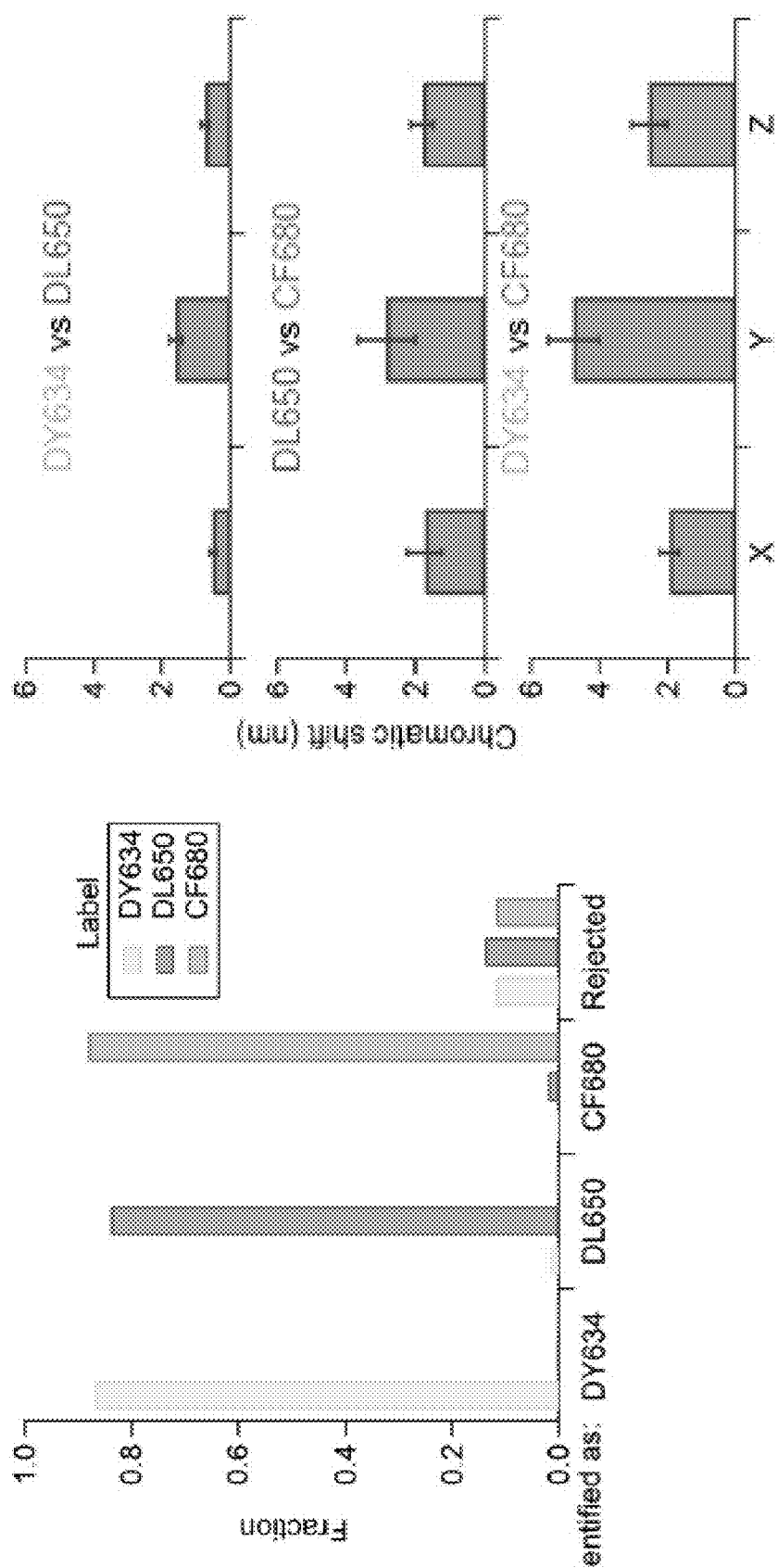
Figure 12C:
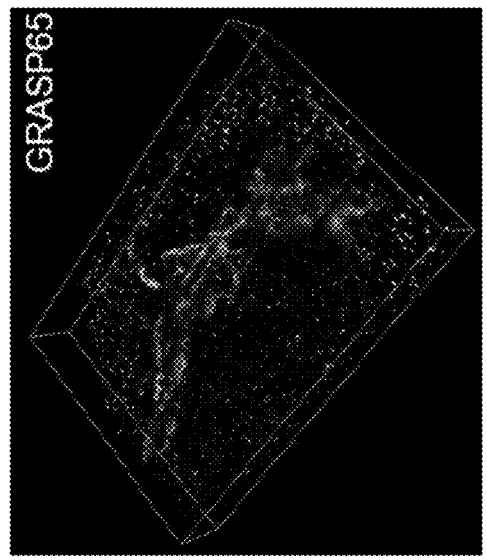
FIG. 12C is a 3D overview image of Golgi labeled with anti-GRASP65 antibody and CF680 labeled secondary antibody.
Figure 12B:
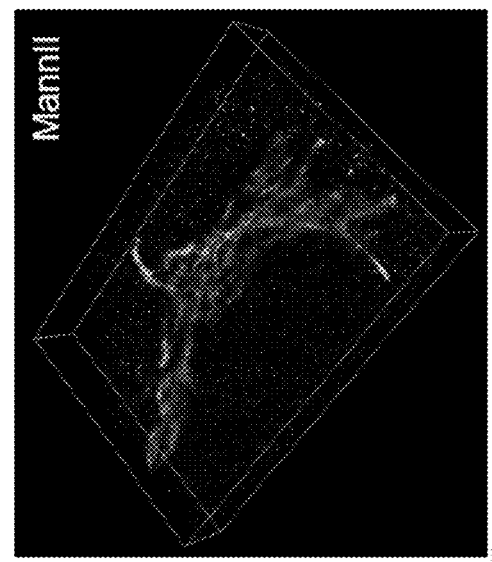
FIG. 12B is a 3D overview image of Golgi labeled by overexpressing MannII-GFP and labeled with anti-GFP nanobody conjugated to DL650.
Figure 12A:
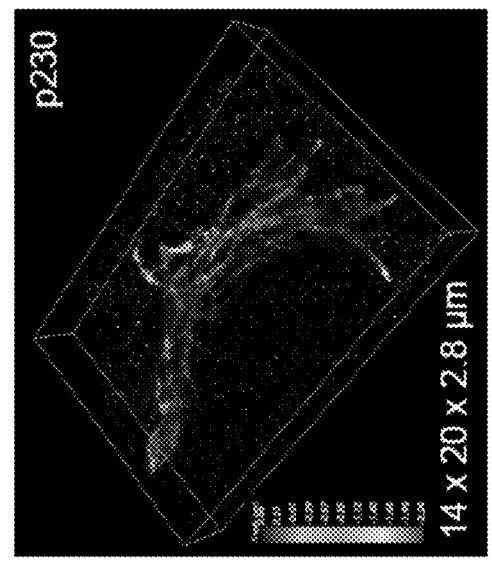
FIGS. 12A-12N are three-color 4Pi-SMS images of Golgi apparatuses in HeLa cells.
Figure 12M:
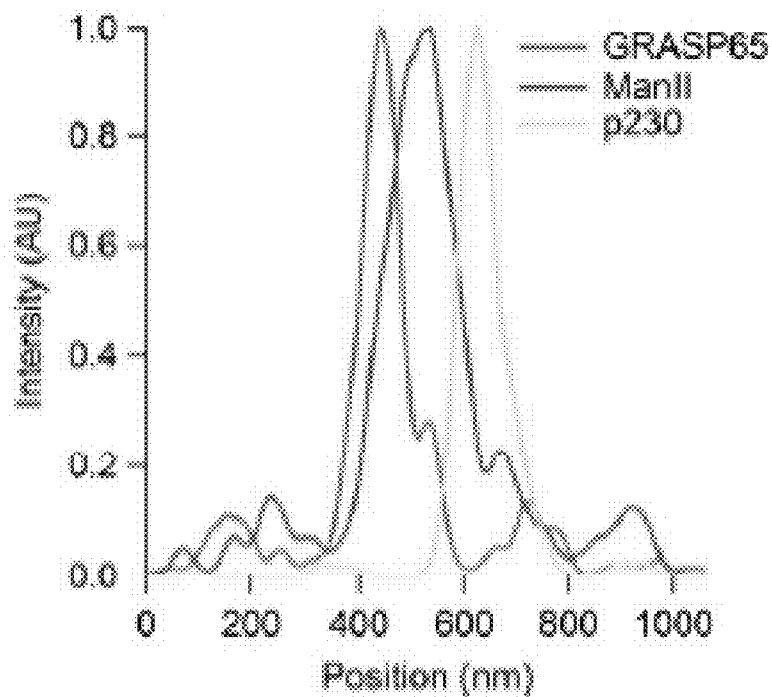
FIG. 12M is a yz view of a 500 nm thick x-slice.
Figure 12N:
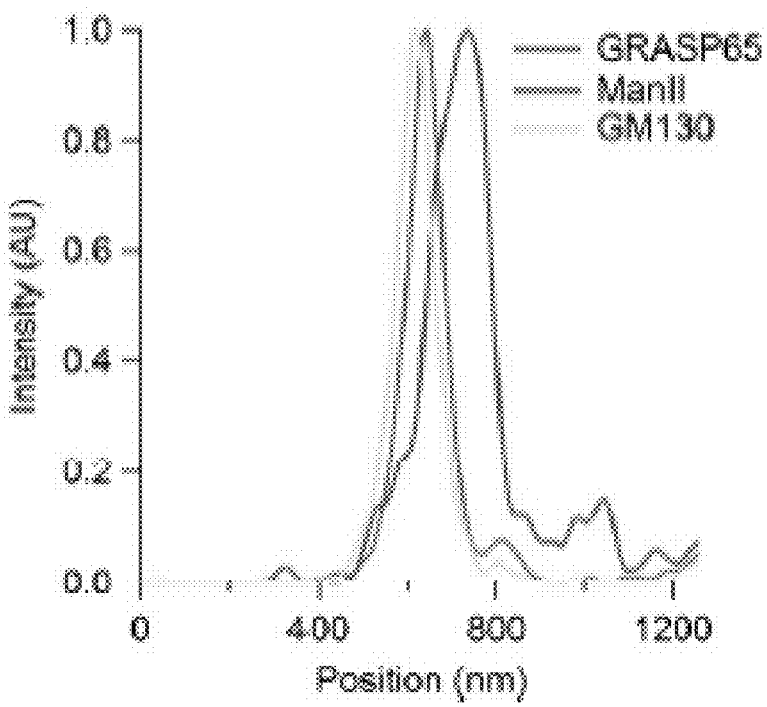
Figure 13B:
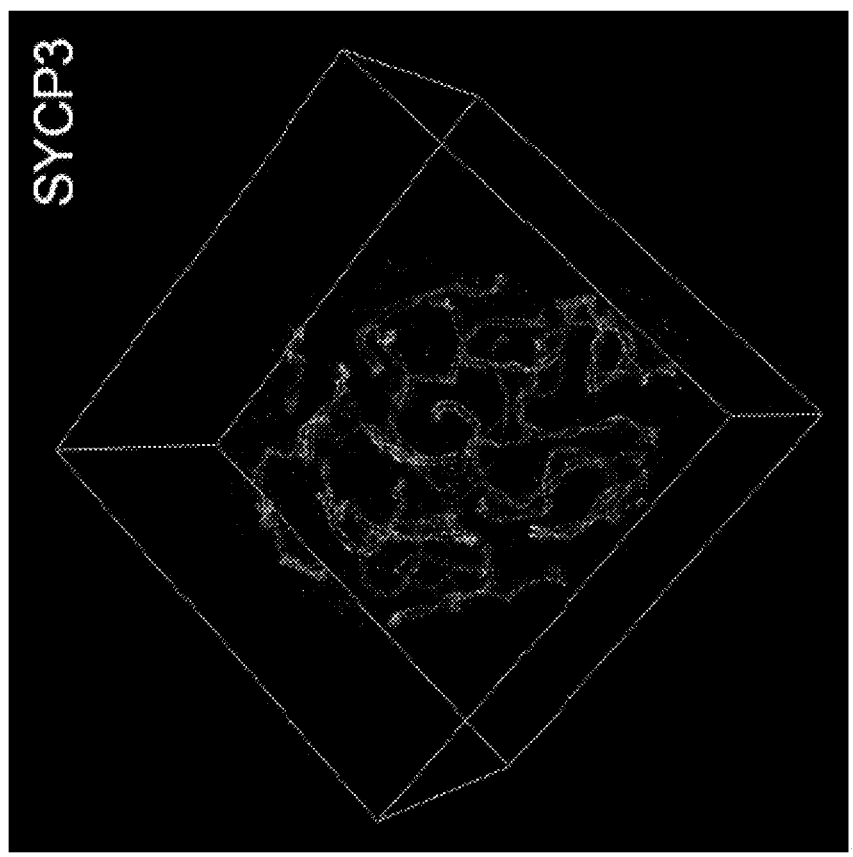
FIGS. 13A-13I are three-color 4Pi-SMS images of synaptonemal complexes in mouse spermatocytes.
Figure 13A:
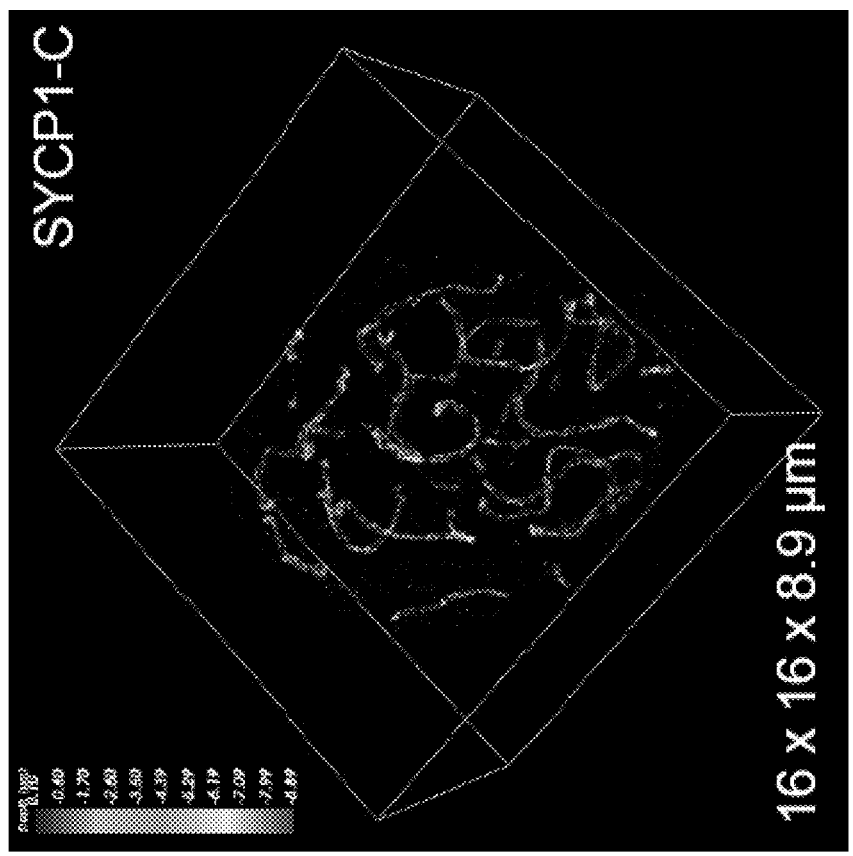
Figure 13D:
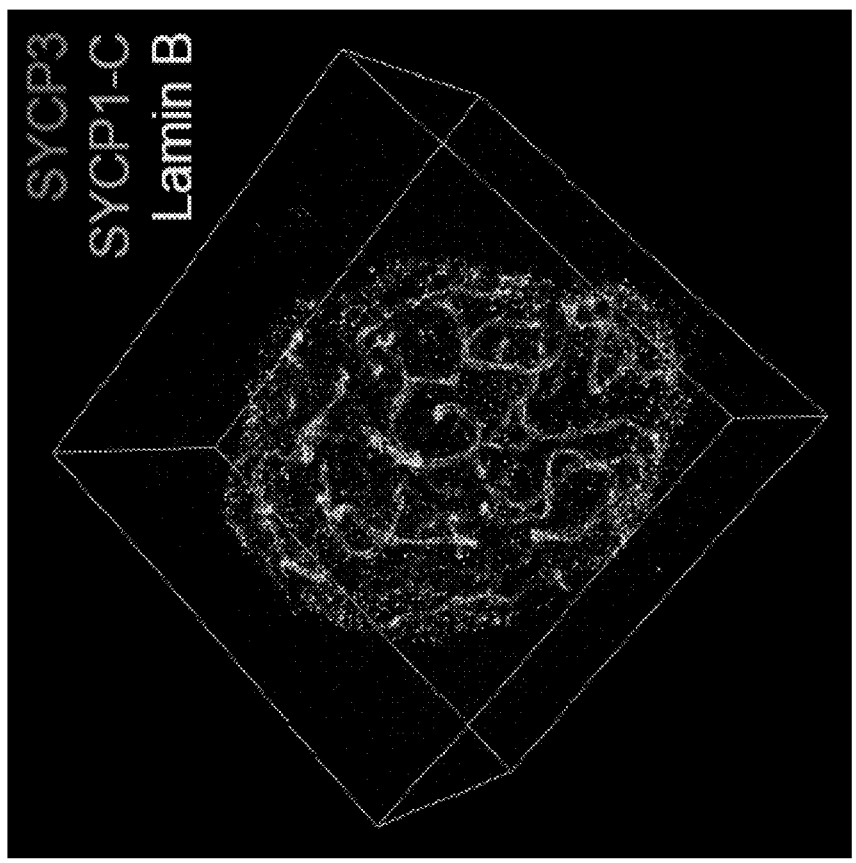
Figure 13C:
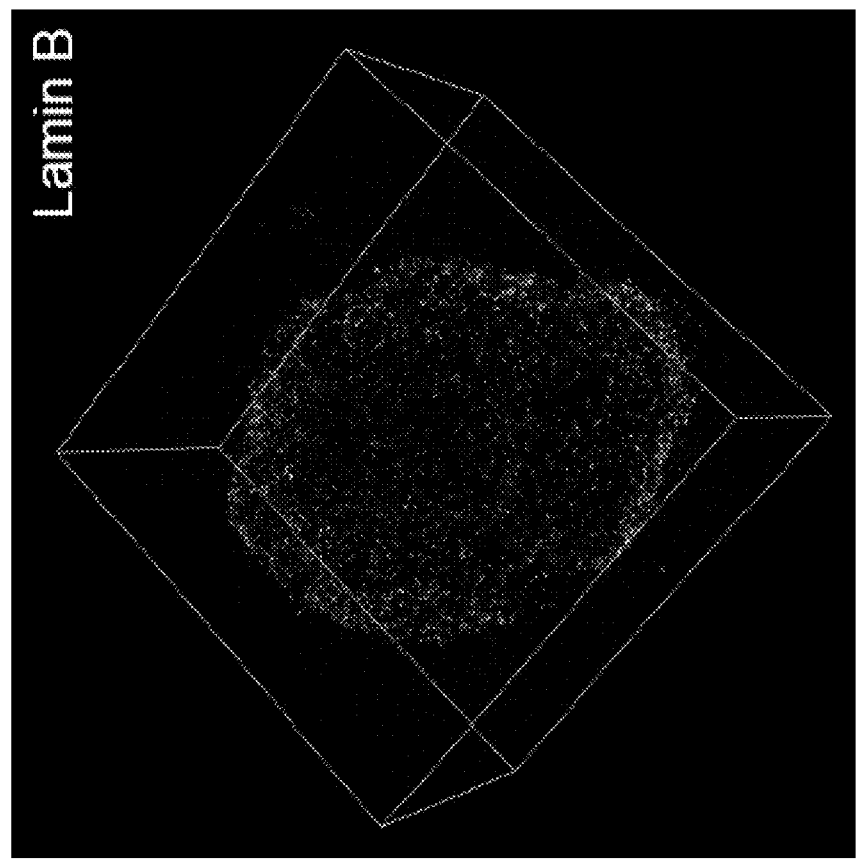
Figure 13E:
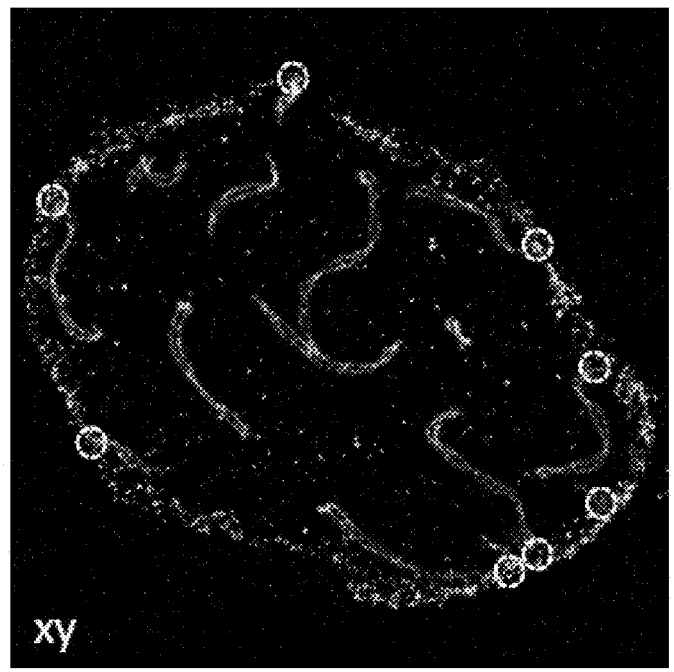
Figure 13E:
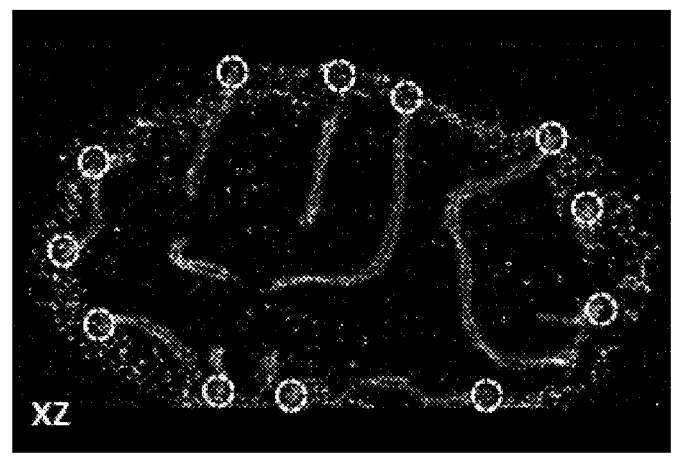
Figure 13E:
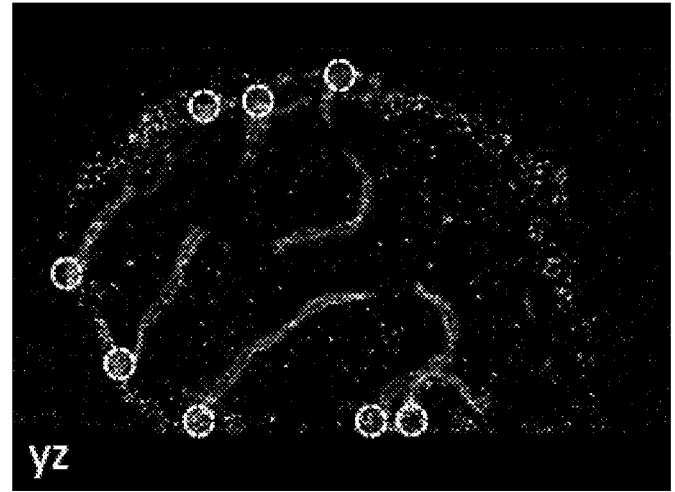
Figure 13G:
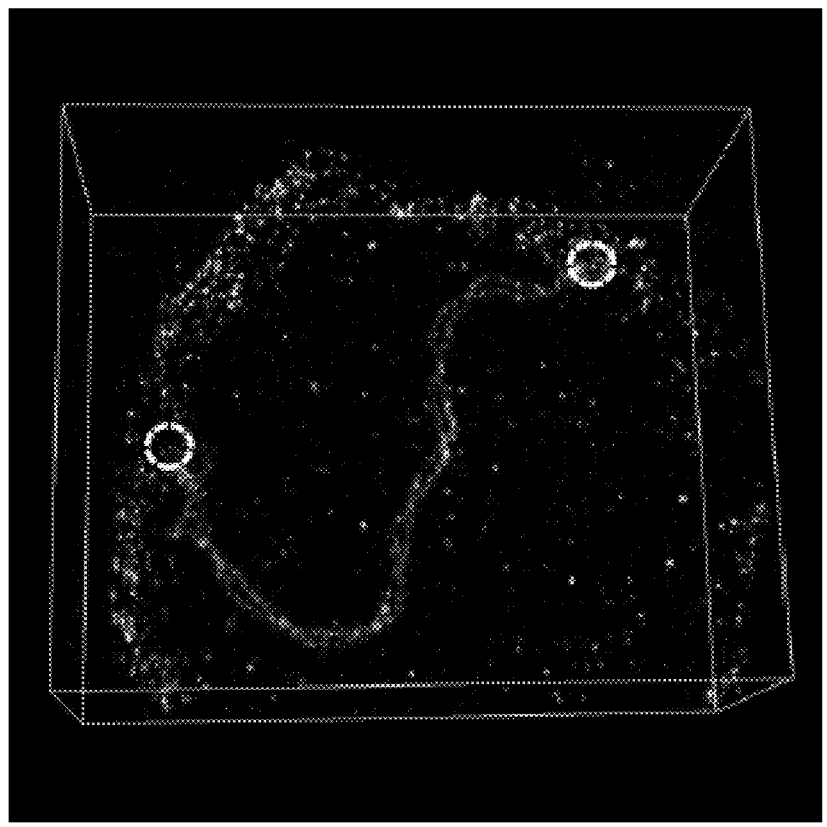
Figure 13F:
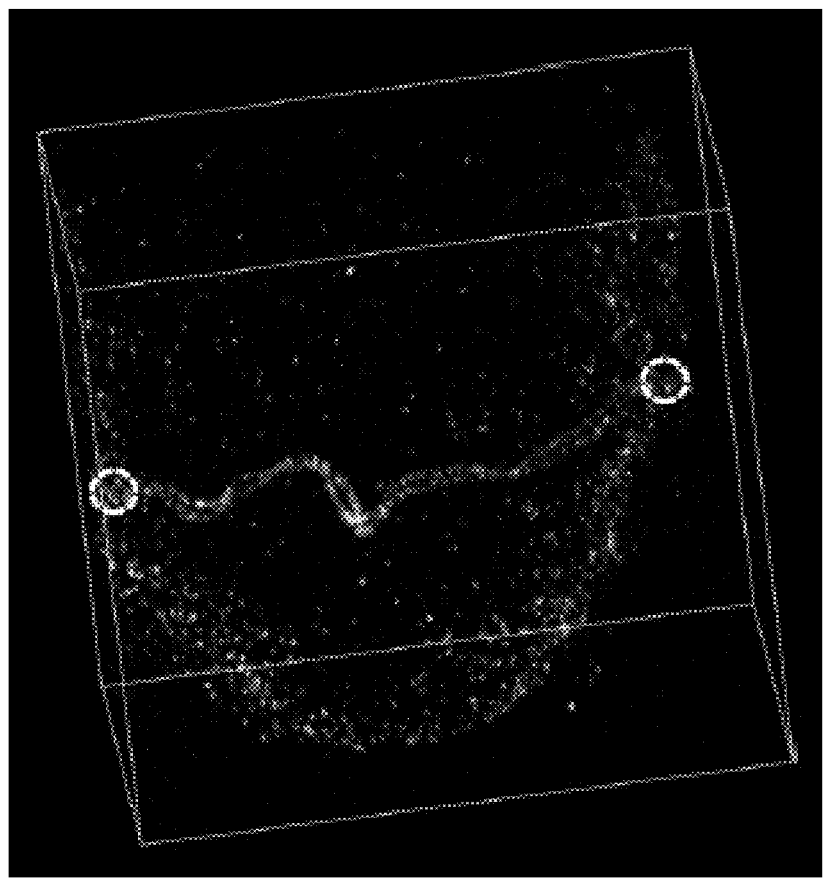
Figure 13I:
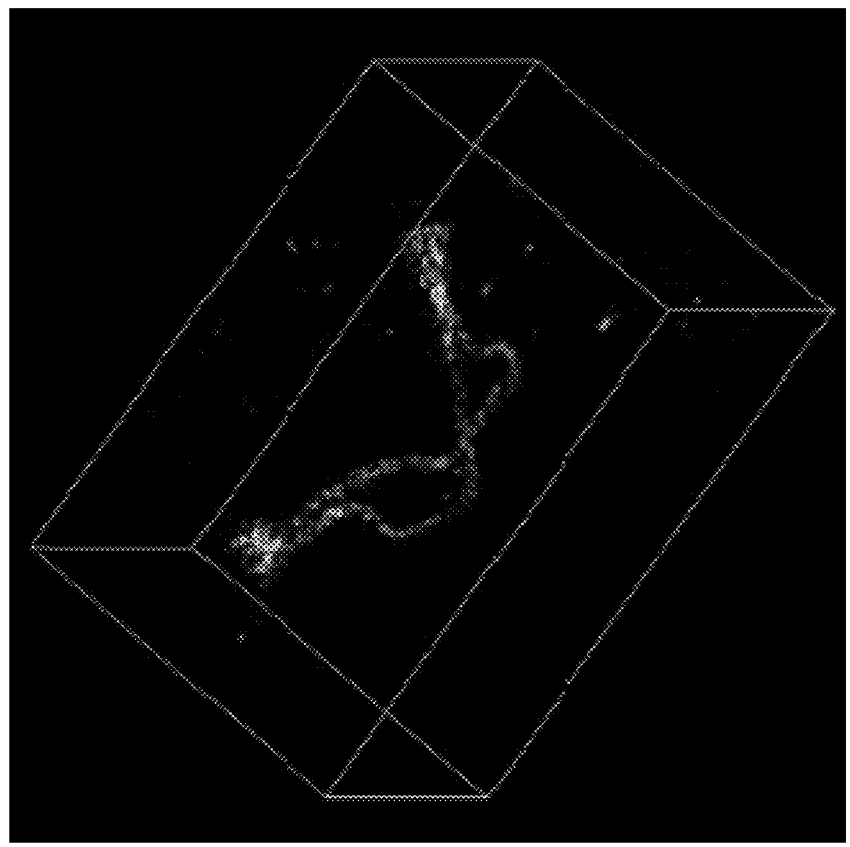
Figure 13H:
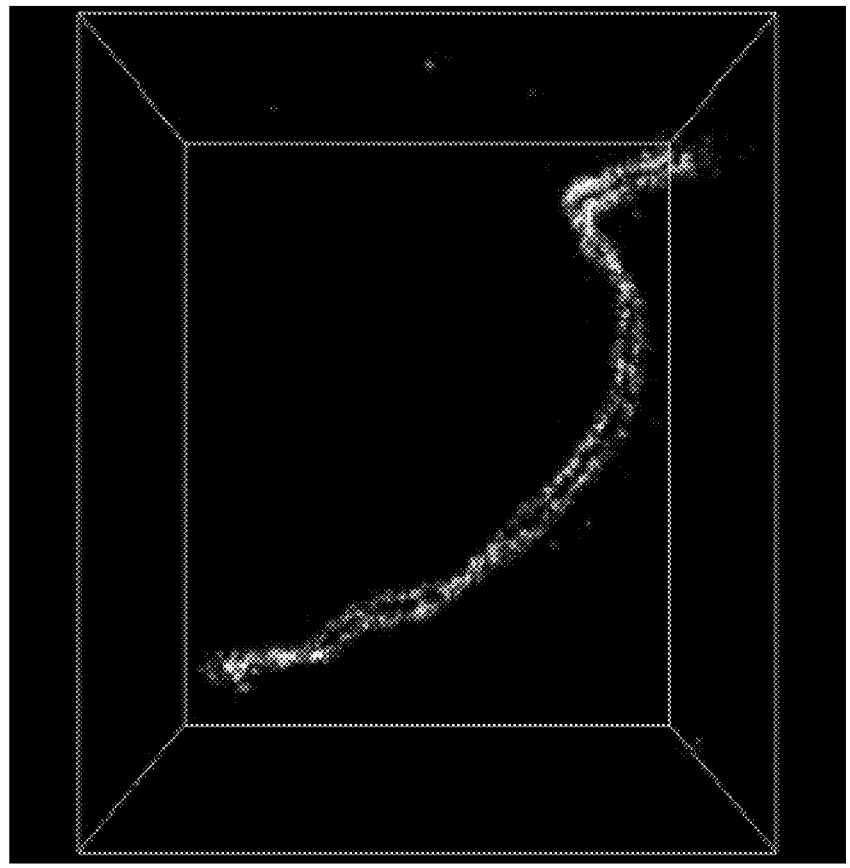

As compared to methods known in the art, the method of the invention achieves lower cross-talk between fluorescent signals without needing to reject nearly as much of the collected fluorescence data (see FIG. 5B). This is achieved by collecting and utilizing fluorescence that is otherwise wasted in other known methods. This salvage fluorescence contains a greater proportion of the sharp, rising blue-edge of the emission spectrum of the smaller wavelength signal, which provides a heavily weighted relative proportion of the smaller wavelength signal (see FIGS. 4C-4I). In two color imaging, the methods of the invention have demonstrated cross-talks below 1% when about 2% of the total molecules are rejected. In three color imaging, the methods of the invention have demonstrated cross-talks below 2% when about 10% of the molecules are rejected.

The advantages over conventional methods are further demonstrated in the context of FIG. 4A. Under conventional fluorescence collection systems and methods (labeled "Conventional"), the captured spectra between relevant to AF647 emissions is also strongly overlapping with CF660C emissions, causing difficulty in distinguishing between the dyes. Embodiments of the invention capture emissions having shorter wavelengths closer to the excitation wavelength of the dyes. This "salvaged" spectra allows capture of the rising edge of the AF647 emission spectra, which is also stronger relative to the emission spectra of the CF660C dye, thereby providing stronger discrimination between the signals.

The method also allows for a single detection window to be used in each camera. By comparison, standard ratiometric imaging methods in the art require the use of at least two detection windows in a single camera in order to image more than one fluorescent signal at a time. This enables for a reduction in chromatic aberrations in comparison to standard ratiometric imaging methods in the art. By detecting single molecules in the same overall detection window using separate cameras, no further channel registration is required. In certain embodiments, this allows for chromatic aberrations to be <2 nm in two-color imaging and <5 nm in three-color imaging.

The fluorescent signals collected by the methods of the invention can be derived from any fluorescent compounds used in the field of fluorescence microscopy. These fluorescent compounds can be fluorescent dyes, proteins, or other biomolecules. Exemplary dyes that can be utilized with the methods of the invention include, but are not limited to DY634, DL650, CF660C, CF680, and AF647. Although two- and three-compound examples are depicted, embodiments of the invention can be applied to with additional compounds.

Although embodiments of the invention are depicted herein integrated with other microscopy components, embodiments of the invention can be implemented as modules that can be added to conventional microscopy systems. Exemplary modules could include an emission filter and/or dichroic mirror configured to transmit a sufficient amount of salvaged fluorescence as described herein. The module could also include software and/or hardware programmed to localize colors based on intensity of emissions, e.g., using ratiometric methods known in the art. The module could further include one or more cameras. In other embodiments, the filtered salvaged emissions could be directed to a separate region of an existing camera utilized, e.g., to capture position of fluorophores.

Embodiments of the invention are implemented with dichroic mirrors and emission filters that may not have perfect transmission/filtration spectra (e.g., as seen in FIG. 4A). Accordingly, salvaged emissions can be described and claimed in a variety of manners to capture Applicant's novel use of these emissions.

Salvaged emissions can be defined with regard to the excitation wavelength used to trigger emissions from the fluorescent compound. For example, the salvaged emissions can include emissions having wavelengths between X and Y nm greater than the excitation wavelength. X and Y can be any non-negative number including 0, integers, and rational or irrational numbers. For example, the salvaged emissions can include emissions having a wavelength between 1 nm and 20 nm greater than the excitation wavelength (e.g., between 1 nm and 2, 3, 4, 5, 6, 7, 8, 9, 10, 11, 12, 13, 14, 15, 16, 17, 18, and 19 nm). For example, if the excitation wavelength is 642 nm, the salvaged emissions can include light between about 643, 644, 645, 646, 647, and 648 nm and 658, 659, 660, 661, and 662 nm, and the like.

Salvaged emissions can also be defined by the amount of the rising edge of the lowest emission spectra captured.

For example, the salvaged emissions can include at least about 1 nm of the rising edge of the shortest emission spectra, e.g., between about 1 nm and about 20 nm, between about 1 nm and about 10 nm, between about 1 nm and about 5 nm, and the like. For example, in FIG. 4A, the Conventional technique does not capture any of the rising edge of the AF647 emission spectra, but the Salvaged emissions capture between about 644 nm and 662 nm of the rising edge of the AF647 emission spectra.

The salvaged emissions can additionally or alternatively include at least a percentage of the rising edge of the shortest emission spectra, e.g., greater than 20%, 30%, 40%, 50%, 60%, 70%, 80%, 90%, and the like. Such percentage can be calculated by dividing the difference between the y-values of the intersections of the salvaged emission transmission curve with the excitation curve by the y-value of the emission peak.

The salvaged emission can also include at least a defined bandwidth at which the shorter emission spectra has an emission intensity exceeding a defined ratio relative to the longer emission spectra. For example, the intensity of the shorter emission spectra can be 1.5, 2, 2.5, 3, 4, and the like times the intensity of the longer emission spectra over a bandwidth between 1, 2, 3, 4, 5, 6, 7, 8, 9, and 10 nm and 5, 6, 7, 8, 9, 10, 11, 12, 13, 14, 15, 16, 17, 18, 19, and 20 nm. Referring again to FIG. 4A, the emission intensity of the AF647 emission spectra exceeds 2 times the emission intensity of the CF660C emission spectra between about 644 nm and about 662 nm within the salvage emissions. In contrast, any bandwidth in which this ratio exists under conventional techniques is considerably narrower.

In certain embodiments, the methods of the invention can be applied to any variety of multicolor fluorescence microscopy. The method can be utilized in methods of single-particle tracking, single-molecule imaging and single-molecule-based super-resolution techniques including 4Pi, PALM, STORM, GSDIM and PAINT. The fluorescence microscopy signals collected by the method and the excitation beam can be derived from a confocal microscopy system. In some embodiments, the fluorescence microscopy signal and the excitation beam are derived from a 4Pi-SMS microscopy system, such as the one described in U.S. Patent Application Publication 2017/0251191.

PROPHETIC EXAMPLE

Traditionally, a multi-color single-molecule switching (SMS) or single-particle tracking (SPT) experiment in live cells is performed by using several fluorophores with well-separated spectrum (e.g., PA-JF549 and PA-JF646) excited simultaneously by multiple illumination lasers (e.g., 561 nm and 642 nm).

This approach has two drawbacks. First, the use of multiple illumination lasers increases phototoxicity to the cells. It has been reported that the light-induced photodamage is dramatically increased at lower irradiation wavelength, while cells can stand light intensity of 6 kW/cm$^2$ for 240 s at 640 nm undamaged. Second, the laser at shorter wavelength (561 nm) will cause significant photobleaching to the fluorophore with longer wavelength spectra (PA-JF646), which reduces the imaging time.

With the ability to image multiple fluorophores with a single laser, the disclosed salvaged fluorescence approach offers more benefits in live cell imaging. This will enable two-color live-cell imaging with a single excitation laser (642 nm), which reduces the phytotoxicity and avoids the photobleaching issue induced by additional lasers.

In conclusion, the salvaged fluorescent approach will open the door for multi-color SMS/SPT imaging in live cells by a single laser with reduced phytotoxicity and photobleaching. It will enable visualization of multiple targets at the same time and investigate their dynamics in live cells.

Applicant performed a simulation to show that the salvaged fluorescence approach produces only minor compromises in localization precision.

Figure 15:
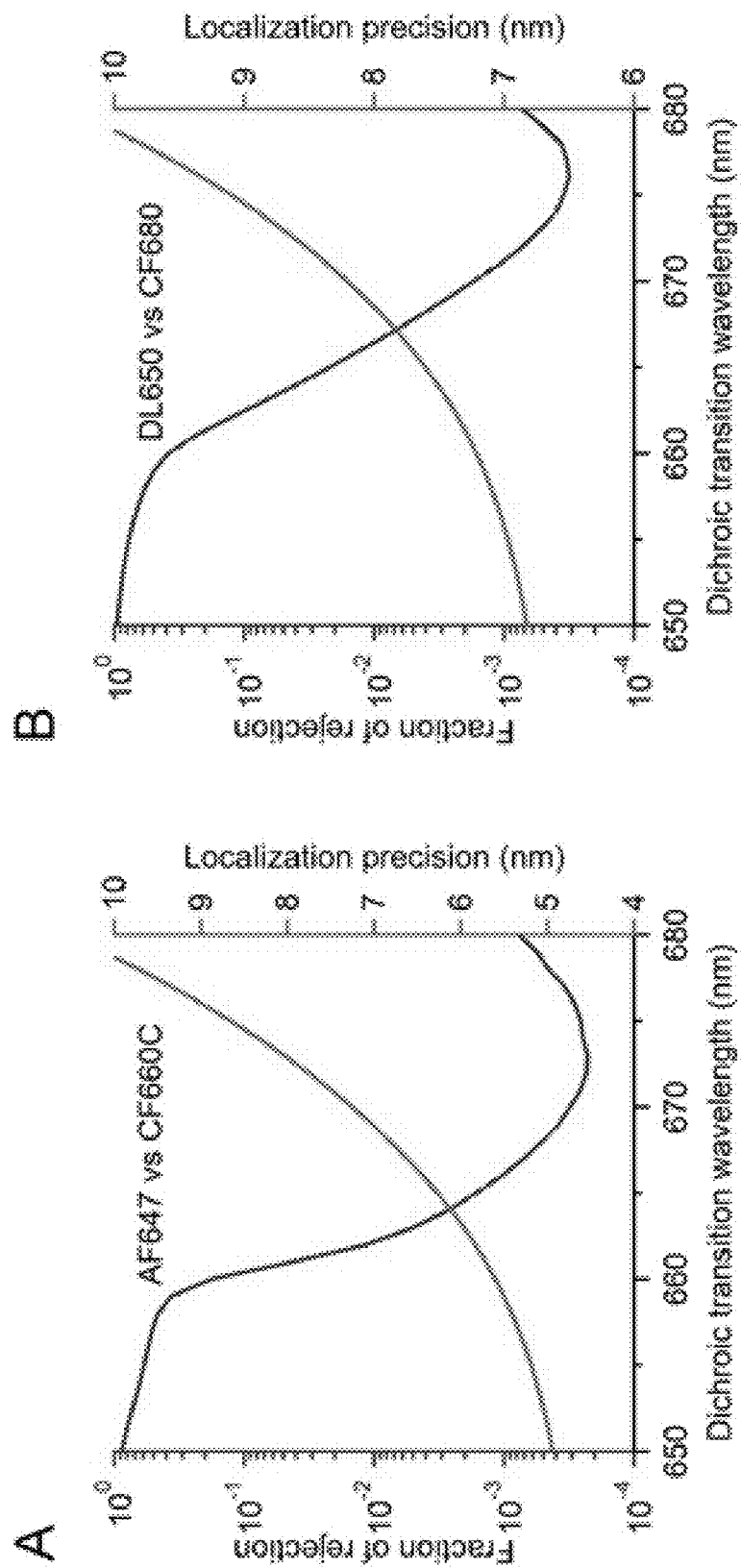
FIG. 15 depicts simulation of the SF approach performance for different transition wavelengths of the dichroic beamsplitter according to an embodiment of the invention. Panel (A) provides simulation results for AF647 and CF660C: the dyes used in two-color imaging. The blue line shows the fraction of rejected molecules when 1% cross-talk is achieved. The green line shows the localization precision of AF647. Panel (B) provides simulation results for DL650 and CF680: two of the dyes used in three-color imaging. The blue line shows the fraction of rejected molecules when 2% cross-talk is achieved. The green line shows the localization precision of DL650.

Salvaging this reflected fluorescence (salvaged fluorescence) provides previously lost spectral information that can be used to assign the molecular identity of an emitter. This approach takes advantage of the fact that spectral assignment and spatial localization precision utilize the fluorescent signal very differently. The former takes advantage of differences between probe spectra, which, given the steep rising edge of the emission spectra, are detected very clearly in the reflected spectral window. This suggests that the salvaged fluorescence window can be quite narrow. The latter depends on the total photon number which, with a narrow salvaged fluorescence window, is mostly collected in the conventional fluorescence channel. Molecules can then be localized based on this channel alone, avoiding the need for accurate registration and chromatic corrections necessary in classical ratiometric imaging, which combines the signal of both channels. Simulations showed that with a transition edge between windows in the 660-670 nm range, dyes excitable at 642 nm and well suitable for SMS can be separated very well (cross-talk fractions 1% to 2%, rejection fractions <1% to 10%) with only minor compromises (~1 nm) in localization precision (FIG. 15.)

Figure 16:
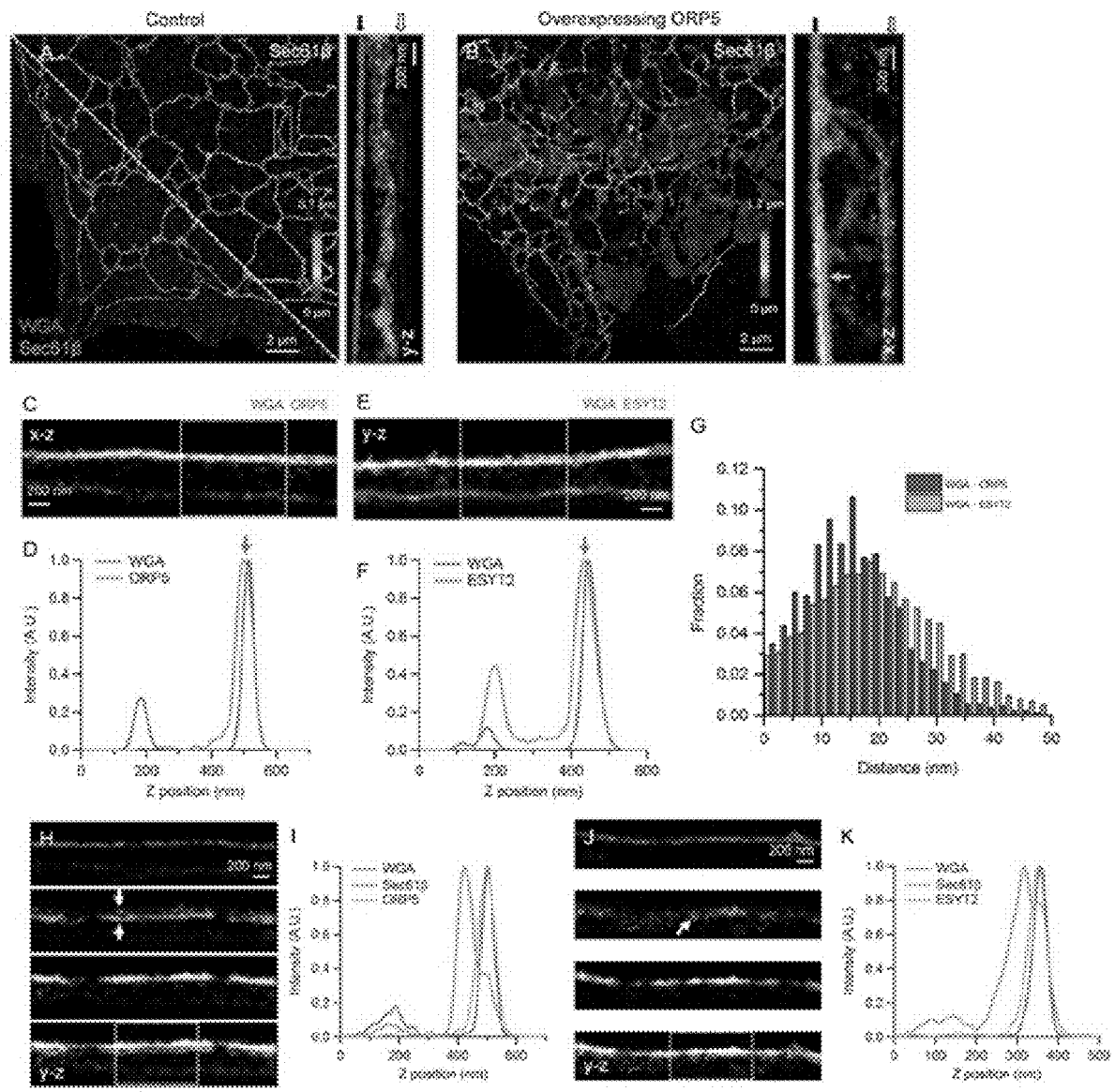
FIG. 16 depicts the 3D architecture of ER-PM contact sites according to an embodiment of the invention. Panel (A) is a two-color image of ER (overexpressed GFP-Sec6113 labeled with anti-GFP antibody and AF647-labeled secondary antibody) and PM (WGA-CF680) in a COS-7 cell. The top-right half shows the ER where rainbow color denotes depth. The bottom-left half overlays ER and PM. The right panel shows magnified a y-z view of the boxed region. Panel (B) provides a two-color image of ER and PM in a cell overexpressing mCherry-ORPS. The right sub-panel shows a magnified x-z view of boxed region. Solid and outlined arrows in Panels (A) and (B) point to the top and bottom PM, respectively. Panel (C) provide two-color images of ORPS (AF647) and PM (CF680) x-z view. Panel (D) provides an axial intensity profile across the dashed box in Panel (C). Panel (E) provides a two-color ESYT2 (AF647) and PM (CF680) y-z view. Panel (F) provide axial intensity profile across the dashed box in Panel (E). Blue arrows in Panels (D) and (F) indicate the distance between PM and contact site proteins. Panel (G) provides histograms of the distance between PM and contact site proteins (from >2800 subregions of 100×100 nm size, n=4 cells per condition). Panel (H) provides three-color ER (DL650), ORPS (DY634) and PM (CF680) y-z view. White arrows indicate the top and bottom membranes of the ER. Panel (I) provides an axial intensity profile across the dashed box in Panel (H). Panel (J) provides a three-color ER (DL650), ESYT2 (DY634), and PM (CF680) y-z view. The white arrow points to an ER tubule. Panel (K) depicts axial intensity profile across the dashed box in Panel (J).

Referring to FIG. 16, Applicant also imaged ER-PM contact sites to show that the salvaged fluorescence approach is able to resolve subcellular structures within the 15-25 nm range.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A method of fluorescence imaging, the method comprising:
 receiving a fluorescence signal comprising:
  an excitation signal;
  a first emission signal for a first fluorophore having a first emission spectra; and
  a second emission signal for a second fluorophore having a second emission spectra different than the first emission spectra;
 filtering the fluorescence signal to:
  isolate a first channel encompassing at least one from the group consisting of:
   a bandwidth of at least 1 nm within which an emission intensity of the first emission spectra is at least two times an emission intensity of the second emission spectra;
   a bandwidth of at least 1 nm of a rising edge of the first emission spectra; and
   at least 10% by height of a rising edge of the first emission spectra; and
  produce a resulting channel comprising the fluorescence signal less the first channel; and
 directing the first channel and the resulting channel to different regions of one or more cameras adapted and configured to collect fluorescence emissions.

2. The method of claim 1, wherein the fluorescence signal is derived from a 4Pi-SMS microscopy system.

3. The method of claim 1, wherein the fluorescence signal is derived from a confocal microscopy system.

4. The method of claim 1, wherein the one or more cameras comprise a first camera and a second camera, and wherein the first channel and the resulting channel are directed towards the first camera and the second camera, respectively, through the use of at least one reflective mirror.

5. A method of fluorescence imaging, the method comprising:
    receiving a fluorescence signal including:
        an excitation signal having an excitation wavelength;
        a first emission signal for a first fluorophore having a first emission spectra; and
        a second emission signal for a second fluorophore having a second emission spectra having a peak at a higher wavelength than the first emission spectra;
    filtering the fluorescence signal via an emission filter to:
        isolate a first channel having:
            a lower bound between 1 nm and 5 nm greater than the excitation wavelength; and
            an upper bound of no greater than 20th percentile of the second emission spectra; and
        produce a resulting channel comprising the fluorescence signal less the first channel; and
    directing the first channel and the resulting channel to different regions of one or more cameras adapted and configured to collect fluorescence emissions.

6. A method of measuring at least two fluorescent signals in a fluorescence microscopy signal admixed with an excitation beam, the method comprising:
    (a) directing the fluorescence microscopy signal and excitation beam towards a first dichroic mirror such that an at least one first fluorescent signal and the excitation beam are reflected off of the dichroic mirror along Path A and an at least one second fluorescent signal is transmitted through the dichroic mirror along Path B;
    (b) directing the at least one first fluorescent signal and the excitation beam on Path A into at least one selected from a second dichroic mirror and an emission filter, such that the excitation beam is separated from the at least one first fluorescent signal and the at least one first fluorescent signal is directed along Path C;
    (c) directing the at least one first fluorescent signal along Path C into a first camera adapted and configured to collect fluorescence emissions; and
    (d) directing the at least one second fluorescent signal along Path B into a second camera adapted and configured to collect fluorescence emissions;
    wherein the fluorescence microscopy signal and the excitation beam are derived from a 4Pi-SMS microscopy system.

7. The method of claim 6, wherein the at least one first fluorescent signal along Path C and the at least one second fluorescent signal along Path B are directed towards the first camera and second camera, respectively, through the use of at least one reflective mirror.

8. The method of claim 6, wherein the at least one first fluorescent signal and the excitation beam on Path A are directed into a second dichroic mirror that reflects the at least one first fluorescent signal along Path C and transmits the excitation beam.

9. The method of claim 6, wherein the at least one first fluorescent signal and the excitation beam on Path A are directed into a second dichroic mirror that reflects the excitation beam and transmits the at least one first fluorescent signal along Path C.

10. The method of claim 6, wherein the at least one first fluorescent signal and the excitation beam on Path A are directed into an emission filter that blocks transmission of the excitation beam and transmits the at least one first fluorescent signal along Path C.

11. The method of claim 6, wherein the wavelength maximum difference between at least one first fluorescent signal and at least one second fluorescent signal is about 10 nm to about 100 nm.

12. The method of claim 6, wherein the wavelength maximum difference between at least one first fluorescent signal and at least one second fluorescent signal is about 20 nm to about 60 nm.

13. The method of claim 6, wherein the fluorescence microscopy signal and the excitation beam are derived from a confocal microscopy system.

\* \* \* \* \*